(12) United States Patent  
Ovadia Nahon et al.

(10) Patent No.: US 9,501,140 B2  
(45) Date of Patent: Nov. 22, 2016

(54) METHOD AND APPARATUS FOR DEVELOPING AND PLAYING NATURAL USER INTERFACE APPLICATIONS

(71) Applicant: ONYSUS SOFTWARE LTD, Kiryat Ata (IL)

(72) Inventors: Dolly Ovadia Nahon, Kiryat Ata (IL); Kfir Matza, Kiryat Ata (IL); Sarel Matza, Kfar-Hasidim (IL)

(73) Assignee: ONYSUS SOFTWARE LTD, Kiryat Ata (IL)

( * ) Notice: Subject to any disclaimer, the term of this patent is extended or adjusted under 35 U.S.C. 154(b) by 0 days.

(21) Appl. No.: 13/668,365

(22) Filed: Nov. 5, 2012

(65) Prior Publication Data

US 2014/0129935 A1    May 8, 2014

(51) Int. Cl.
  *G06F 3/01*   (2006.01)
  *G06F 3/048*  (2013.01)
  *G06F 9/44*   (2006.01)

(52) U.S. Cl.
  CPC ............. *G06F 3/01* (2013.01); *G06F 3/048* (2013.01); *G06F 8/34* (2013.01); *G06F 8/38* (2013.01); *G06F 9/4443* (2013.01)

(58) Field of Classification Search
  None
  See application file for complete search history.

(56) References Cited

U.S. PATENT DOCUMENTS

| | | | |
|---|---|---|---|
| 7,813,822 B1 * | 10/2010 | Hoffberg | 700/94 |
| 8,933,970 B2 * | 1/2015 | Saklatvala et al. | 345/633 |
| 2003/0212543 A1 * | 11/2003 | Epstein et al. | 704/9 |
| 2005/0172261 A1 | 8/2005 | Yuknewicz et al. | |
| 2008/0155479 A1 | 6/2008 | Long et al. | |
| 2008/0192048 A1 | 8/2008 | Nabais Nobre | |
| 2009/0015113 A1 | 1/2009 | Nabais Nobre | |
| 2009/0037354 A1 | 2/2009 | Fernandes et al. | |
| 2009/0085864 A1 | 4/2009 | Kutliroff et al. | |
| 2009/0313748 A1 | 12/2009 | Guedes Lopes Da Fonseca et al. | |
| 2010/0030578 A1 * | 2/2010 | Siddique et al. | 705/3 |
| 2010/0208038 A1 | 8/2010 | Kutliroff et al. | |
| 2011/0040539 A1 * | 2/2011 | Szymczyk et al. | 703/6 |

(Continued)

FOREIGN PATENT DOCUMENTS

EP          1240623 B1     6/2001
WO    WO 2005116805 A1 *   12/2005

OTHER PUBLICATIONS

Frederic Cordier, Hyewon Seo, and Nadia Magnenat-Thalmann, "Made-to-Measure Technologies for an Online Clothing Store," MiraLab, University of Geneva, Switzerland, Web Graphics (Published by the IEEE Computer Society), Jan./Feb. 2003.*

(Continued)

*Primary Examiner* — Maryam Ipakchi
(74) *Attorney, Agent, or Firm* — The Law Office of Joseph L. Felber

(57) ABSTRACT

An apparatus method and computer program product for developing and executing NUI applications. The apparatus for developing the NUI application comprising a development platform comprising a design manager for indicating a NUI object and a graphic object, wherein the graphic object is designed to track movements of the NUI object, based on movements of an object captured by a NUI device and associated with the NUI object when the application is executed; an interactive manager for managing interactive actions between the NUI object and the graphic object; and a NUI manager for defining a NUI device to be supported by a computing platform executing the application, wherein the application is developed graphically.

16 Claims, 9 Drawing Sheets

(56) References Cited

U.S. PATENT DOCUMENTS

| | | | |
|---|---|---|---|
| 2011/0107216 A1* | 5/2011 | Bi | 715/716 |
| 2011/0197161 A1* | 8/2011 | Mattingly et al. | 715/810 |
| 2011/0296352 A1 | 12/2011 | Lobb | |
| 2011/0296505 A1* | 12/2011 | Perez et al. | 726/6 |
| 2012/0023460 A1 | 1/2012 | Blumenberg | |
| 2012/0030646 A1* | 2/2012 | Ravindran et al. | 717/105 |
| 2012/0042246 A1* | 2/2012 | Schwesinger et al. | 715/716 |
| 2012/0095589 A1* | 4/2012 | Vapnik | 700/132 |
| 2012/0151432 A1 | 6/2012 | Long et al. | |
| 2012/0227028 A1* | 9/2012 | Pun et al. | 717/108 |
| 2012/0291006 A1* | 11/2012 | Quine | 717/105 |
| 2012/0306734 A1* | 12/2012 | Kim et al. | 345/156 |
| 2012/0308140 A1* | 12/2012 | Ambrus et al. | 382/190 |
| 2012/0309477 A1* | 12/2012 | Mayles et al. | 463/3 |
| 2012/0313955 A1* | 12/2012 | Choukroun | 345/582 |
| 2013/0097194 A1* | 4/2013 | Braga et al. | 707/758 |
| 2013/0155105 A1* | 6/2013 | Boldyrev et al. | 345/633 |
| 2013/0191768 A1* | 7/2013 | Thompson et al. | 715/765 |
| 2015/0012905 A1* | 1/2015 | Emmons | G06F 8/38 717/101 |

OTHER PUBLICATIONS

Patent Cooperation Treaty. "Notification of Transmittal of the International Search Report and the Written Opinion of the International Searching Authority, or the Declaration". Issued for PCT/IL2013/050830 on Feb. 11, 2014. (12 Pages).

"Accelerometer based user interfaces for the control of a physically simulated character". ACM Transactions on Graphics (SIGGRAPH Asia 2008), 27(5), Dec. 2008 Takaaki Shiratori, Jessica K. Hodgins Dec. 31, 2008 (Dec. 31, 2008).

Omek Beckon TM Development Suit. Datasheet [online]. Omek Interactive Ltd., 2011. Retrieved from the Internet: <http://pewa.panasonic.com/assets/pcsd/datasheets/d-imager-omek-beckon-sdk-datasheet.pdf> Dec. 31, 2011 (Dec. 31, 2011).

P. Viola, M. Jones, Fast and robust classification using asymmetric adaboost and a detector cascade, *Advances in Neural Information Processing Systems*, vol. 2, pp. 1311-1318 (2002).

M. Isard, A. Blake, Condensation—conditional density propagation for visual tracking, *International Journal of Computer Vision*, vol. 29 Issue 1, 5-28 (1998).

L. Sigal, A. Balan and M. J. Black. HumanEva: Synchronized Video and Motion Capture Dataset and Baseline Algorithm for Evaluation of Articulated Human Motion, *In International Journal of Computer Vision*, vol. 87 (1-2), (2010).

O. Freifeld, A. Weiss, S. Zuffi, and M. J. Black ,Contour people: A parameterized model of 2D articulated human shape, *IEEE Conf. on Computer Vision and Pattern Recog., CVPR*, pp. 639-646, (2010).

L.E. Baum and T. Petrie, Statistical Inference for Probabilistic Functions of Finite State Markov Chains, *Ann. Math. Statist.* vol. 37, No. 6, 1554-1563 (1966).

L. E. Baum, T. Petrie, Ge. Soules, N. Weiss, A Maximization Technique Occurring in the Statistical Analysis of Probabilistic Functions of Markov Chains *The Annals of Mathematical Statistics*, vol. 41, No. 1., pp. 164-171 (1970).

Y.Freund and R. E. Schapire. , A decision-theoretic generalization of on-line learning and an application to boosting. *Journal of Computer and System Sciences*, 55(1):119-139 (1997).

* cited by examiner

METHOD AND APPARATUS FOR DEVELOPING AND PLAYING NATURAL USER INTERFACE APPLICATIONS

TECHNICAL FIELD

The present disclosure relates to natural user interfaces (NUIs) for computerized systems in general, and to a platform for developing NUI applications without programming and a player for playing the applications, in particular.

BACKGROUND

Natural user interface (NUI) devices such as touch screens, depth cameras or three dimensional cameras are becoming more and more popular due to their high availability, appealing features and dropping prices.

NUI systems comprise advanced sensors and utilize advanced algorithms for identifying a user, recognizing voice and gestures, and providing reactions. These abilities provide users with the option to communicate with or operate computerized systems using natural gestures, and enable smooth, natural and intuitive interaction. In some embodiments, such as Microsoft Kinect™, NUI devices may be used in immersive environment, i.e., an environment in which the user feels that he is part of the occurrences in the system, whether it is the user's image, voice, movements or another input that is being used. Such environments may benefit a lot from the augmentation of the person into the system.

However, developing applications that make use of NUI devices is labor intensive and requires complex programming. For example, a public relations (PR) agent may wish to provide a client who is a sunglasses retailer with an application that enables a customer interested in purchasing sunglasses to select a pair from a catalog, and using a camera that captures the client's face, to show the customer's face with the selected glasses on, without the customer actually trying them on or even having them physically on site. The application may also show the client in a dynamic manner, for example from different angles, when moving, or the like.

The PR agent may additionally or alternatively wish to provide another client who is a movie producer, with an application that immerses the users into a movie scene, interacts with the actors and become part of the trailer cast in a themed environment and custom clothing.

With existing technologies, the PR agent, vendors, or other media creators have to initiate a long, complex and expensive programming effort for generating such applications, which may require a lot of programming resources in addition to content-specific knowledge, and may incur costs and create a bottleneck which increases time to market. Media creators are thus at a frustrating position, in which they lack tools to fully utilize the new available exciting technology.

Exiting NUI technologies include depth cameras such as Kinect® manufactured by Microsoft or Redmond, Wash., USA, which enables users to play games using bodily gestures without external objects. Developers may use the Kinect System Development Kit (SDK) for developing Kinect-based applications. Other technologies include cameras such as manufactured by LeapMotion® of San-Francisco, Calif., USA, which may easily interface to any computer and recognize hand gestures, software solutions such as those suggested by XTR of Herzliya, Israel, which extract depth information from 2D cameras; XTION manufactured by ASUS Beitou District, Taipei, Taiwan, using which developers may use the OpenNI NITE SDK for developing XTION or Kinect based applications; sensors and microcontrollers such as Arduino from Ivrea, Italy, using which developers may develop in open source Arduino environment, or others.

Such cameras are being integrated and used in platforms such as smartphones, laptops, smart TVs, or any other computing platforms.

Other NUI devices may include NUI glasses, hand tracking devices and touch displays, such as Microsoft's Digits, wrist sensor manufactured by Ringbow of Israel, Google Glass by Google located of Menlo Park, Calif., U.S., Microsoft PixelSense that enables a display to recognize fingers, hands, and objects placed on the screen, made by Samsung of Seoul, South Korea, Smart Window which consists of a transparent touchscreen LCD, Digital Signage Endcap manufactured by Intel® of California, U.S, or such. Projection solutions such as floor projection, window projection, 3D projection or others may be also be significantly enhanced with the use of NUI applications. In addition to hardware devices, there are also advanced tracking and recognition algorithms implementing features such as but not limited to: facial detection and recognition; face tracking; eye tracking; body tracking; gesture recognition of hand; facial or body gestures; voice recognition or others.

The devices and algorithms mentioned above are suitable and may be integrated into NUI applications, but nevertheless the development of such applications requires programming, and therefore do not enable easy and fast application development.

BRIEF SUMMARY

One exemplary embodiment of the disclosed subject matter is an apparatus having a processing unit and a storage device, the apparatus comprising: a natural user interface (NUI) development platform for developing a NUI application, the development platform comprising: a design manager for indicating a NUI object, and a graphic object, such that the graphic object is designed to track the movements of the NUI object, based on movements of an object captured by a NUI device and associated with the NUI object when the NUI application is executed; an interactive manager for managing interactive actions between the NUI object and the graphic object; and a NUI manager for defining a NUI device to be supported by a computing platform executing the NUI application, wherein the NUI application is developed graphically. Within the apparatus, the graphic object may be designed to track the NUI object on a tracking point or a tracking area comprising three or more tracking points defined on the NUI object. Within the apparatus, the design manager may provide for indicating a reference point on the NUI object. Within the apparatus, the graphic object may be associated with a pinning point associated with a physical property, such that the graphic object or part thereof tracks the NUI object in accordance with the physical property, when the NUI application is executed. Within the apparatus, the graphic object may be selected from the group consisting of: a three dimensional representation of a physical object; a two dimensional representation of a physical object; an image; a video signal; an audio signal; a drawing; an illustration; and a recorded object. Within the apparatus, the NUI device may be selected from the group consisting of: web camera, a depth camera, a Kinect™ device, a WII® remote control, a leap, a ringbow, an EEG helmet, a PS3® device, a smart phone a tablet, XTION, Microsoft's Digits, Microsoft PixelSense, Smart Window, Google glass, Motorola HC1, PMD[Vision]® cameras, and a computing platform equipped with a touch sensor. The apparatus may further comprise a gesture manager for defining gestures available in the system for the NUI device. The apparatus may further comprise a passive media manager for handling passive media, the passive media manager comprising a media encoder for associating an identifier with a video signal. Within the apparatus, the interactive actions may be provided by one or more interactive objects. Within the apparatus, the interactive object may be associated with programming commands when the NUI application is executed. Within the apparatus, the NUI object may be associated with a predefined gesture, and the NUI object may be connected to at least one interactive object by a connector in a flowchart-like visual programming. Within the apparatus, the interactive manager may provide for one or more connector types, each of the connector types associated with a conditional statement. Within the apparatus the development platform may provide a developer with visual representation of the human body or parts thereof, and tools to edit live video in a visual environment. Within the apparatus the development platform may provide for object recording, such that the object is recognized once captured by the NUI device.

Another aspect of the disclosure relates to an apparatus having a processing unit and a storage device, the apparatus comprising: a player for executing a NUI application, the player comprising: a NUI controller for receiving input from a NUI device; a decoder for identifying a gesture in the input received from the NUI device; a local interactive media storage for storing a graphic object; and an interactive media executor for integrating the graphic object with the input such that the graphic object tracks a NUI object identified in the input in accordance with a gesture of the NUI object. Within the apparatus the player may further comprise a physicality engine for implementing physical properties and behaviors defined on the graphic object when reacting to the NUI object. Within the apparatus the NUI device may be selected from the group consisting of: web camera, a depth camera, a Kinect™ device, a WII® remote control, a leap, a ringbow, an EEG helmet, a PS3® device, a smart phone a tablet, XTION, Microsoft's Digits, Microsoft PixelSense, Smart Window, Google glass, Motorola HC1, PMD[Vision]® cameras, and a computing platform equipped with a touch sensor. Within the apparatus the NUI device may be selected as a most suitable device connected to the apparatus.

Yet another aspect of the disclosure relates to an apparatus having a processing unit and a storage device, the apparatus comprising: a player for executing a NUI application, the player comprising: a NUI controller for receiving input from a NUI device; a decoder for identifying a NUI object in the input received from the NUI device; an interactive media loader for loading a NUI application; a passive media receiver for receiving passive media; and an interactive media executor for integrating output from the NUI application comprising input from the NUI device, with the passive media. Within the apparatus, the passive media is optionally a TV broadcast. The apparatus may further comprise a signal decoder for identifying a signal in the passive media, and integrating a NUI object associated with the NUI device into the passive media. Within the apparatus, the NUI application may be received from a cloud service to a television, a set up box, or a computing platform in accordance with one or more parameters.

Yet another aspect of the disclosure relates to a computer-implemented method performed by a computerized device, comprising: receiving a NUI application, comprising: receiving a NUI object, and a graphic object, such that the graphic object is designed to track the movements of the NUI object, based on movements of an object captured by a NUI device and associated with the NUI object when the NUI application is executed, and receiving interactive actions between the NUI object and the graphic object; receiving an indication to a NUI device to be supported by a computing platform executing the NUI application; and storing the NUI application on a storage device, wherein the NUI application is developed graphically. Within the computer-implemented method, the NUI application may be selected from the group consisting of: a user interacting with an object; and a user interacting with a projected surface.

Yet another aspect of the disclosure relates to a computer-implemented method performed by a computerized device, comprising: receiving streamed data; sniffing the streamed data for a signal; responsive to identifying the signal in the streamed data, searching for corresponding downloaded media; responsive to locating the downloaded media, integrating the streamed data with the downloaded media at a location associated with a location in which the signal was identified.

Yet another aspect of the disclosure relates to a computer program product comprising: a non-transitory computer readable medium; a first program instruction for receiving a NUI application, comprising: an instruction for receiving a NUI object, and a graphic object, such that the graphic object is designed to track the movements of the NUI object, based on movements of an object captured by a NUI device and associated with the NUI object when the NUI application is executed, and an instruction for receiving interactive actions between the NUI object and the graphic object; a second program instruction for receiving an indication to a NUI device to be supported by the platform when the NUI application is executed; and a third program instruction for storing the NUI application on a storage device, wherein the NUI application is developed graphically, and wherein said first, second, and third program instructions are stored on said non-transitory computer readable medium.

Yet another aspect of the disclosure relates to a computer program product comprising: a non-transitory computer readable medium; a first program instruction for receiving streamed data; a second program instruction for sniffing the streamed data for a signal; a third program instruction for responsive to identifying the signal in the streamed data, searching for corresponding downloaded media; and a fourth program instruction for responsive to locating the downloaded media, integrating the streamed data with the downloaded media at a location associated with a location in which the signal was identified, wherein said first, second, third, and fourth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Definitions

Figure 1:
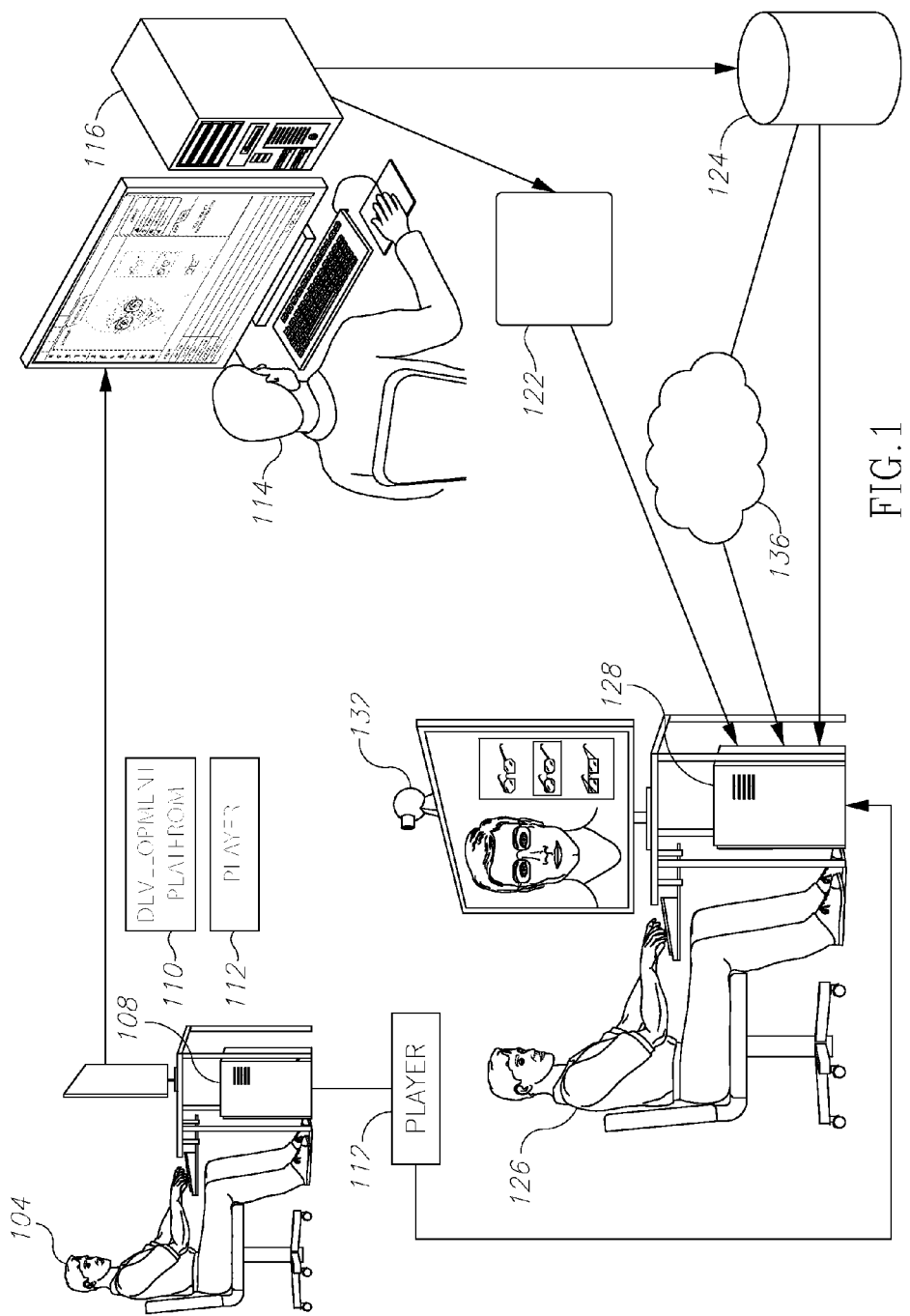
FIG. 1 is a block diagram of the main components and activities in providing and using a platform for developing NUI applications, in accordance with some exemplary embodiments of the disclosed subject matter.

NUI: Natural User Interface is an interface between a human and a computing platform which enables a human to input data into a computer in a manner that is natural to the user and does not require additional input devices such as a mouse, a keyboard, or the like, thus significantly reducing the learning curve and adaptation periods;

Platform: a platform, or a development platform is a software product or unit that provides a development environment for generating applications, projects, content, or the like, wherein the applications or projects may be used by end users or clients;

Player/NUI player: a software product adapted to display or execute applications, project or content of one or more specific types, such applications or projects developed by a platform. A NUI player is adapted to communicate with NUI devices (see below), optionally using device drivers, and to receive data from a user via the NUI devices or other channels. A NUI player may integrate data captured through the NUI device with graphical objects, streamed media, or other elements;

NUI device: a hardware device that receives input from a user and communicates the input to a computing device, in a manner that is natural to the user, such as a camera capturing gestures by the user, a touch screen, a voice capturing device, or the like;

NUI object: a data structure implemented by a software component that describes the properties, features and other characteristics of an object captured by a NUI device and enables actions to be performed on the description. Each such data structure may represent a human body as a whole or a part such as face, hand, body, voice, touch, eyes, or the like;

Recorded Object: an object which is analyzed and translated into a data structure for later recognition when captured by a NUI device. A recorded object may be a physical object such as a chair, a generic object such as any chair, recognizable surrounding, or the like;

Graphic object: a data structure implemented by a software component that describes an entity that may have a graphic display, such as a 2D or 3D representation of a physical object; an image, a drawing, a video, sound, a part of an image, or others;

Interactive object: an entity that is associated with a set of pre-programmed commands and enables interactive actions on one or more objects;

Note: if the development platform is created, e.g., programmed in an object oriented paradigm, the types of objects defined above may be implemented using classes in a class hierarchy, Tracking point: a location defined relatively to a NUI object or a part thereof, wherein the tracking point may be native to the NUI object or defined by a user. If the NUI object is moved, a tracking point defined thereon moves in space but remains in the same location relative to the object or a part thereof;

Pinning point: a location defined on a graphic object or a part thereof, which may be pinned or attached to a tracking point or a tracking area (see below) of a NUI object, the graphic object is to be displayed as complying with physics laws such as gravity, fundamental forces, particle physics or others;

Tracking area or a tracking mask: one or more tracking points grouped together. A tracking area may be associated with a pinning point on a graphic object, such that the graphic object tracks the tracking area when the NUI object moves;

Reference point: locations in the working space which enable relative locations between tracking points on NUI objects, locations on graphic objects, and other locations in space;

Physical point: a point that extends physical properties assigned to a graphic object. A physical point may be located on a particular part of the graphic object, and a sequence or area of physical points may be created, such that the physical properties of the points are implied on the part or area of the graphic object. For example using physical points, a handle of a bag may be assigned elasticity properties different from those of the bag itself;

Layer: a layer is a visual representation of an object on the stage such as NUI objects, 2-D images, video files, sound files, 3D objects, tracking areas, effects or others; a layer may be represented in a timeline (see below)

Timeline: timeline is an output product of the main working area of the development platform on which different layers may be located and arranged in a hierarchy in specific time areas, and on which the interrelationships between objects may be defined.

The subject matter disclosed below is refers to flowcharts and block diagrams describing methods, apparatus, system, or computer program products according to embodiments. It will be appreciated that parts of the block and flowcharts, and combinations of parts, can be implemented by computer program instructions. The computer program instructions may be provided to one or more processors of any computer such as a general purpose computer, special purpose computer, a processor, or other programmable data processing apparatus to produce a machine, such that the instructions, which execute via the processor of the computer or other programmable data processing apparatus, create means for implementing the functions or steps specified in the flowcharts or one or more blocks of the block diagrams.

These computer program instructions may be stored in a non-transient computer-readable medium that can direct a computer or other programmable data processing apparatus to function in a particular manner, such that the instructions stored in the non-transient computer-readable medium produce an article of manufacture including instruction means which implement the functions or acts or blocks specified in the flowchart or block diagram.

The computer program instructions may be loaded onto a device, a computer or other programmable data processing apparatus to cause a series of operational steps to be performed on the computer or other programmable apparatus to produce a computer implemented process such that the instructions which execute on the computer or other programmable apparatus provide processes for implementing the functions, acts, or blocks specified in the flowchart or block diagram.

One technical problem dealt with by the disclosed subject matter is the lack of tools for developing in a relatively easy manner Natural User Interface (NUI) applications which make use of NUI devices. NUI applications are highly graphical in their nature, and developing them in a non-visual environment is limiting and requires significant effort and imagination capabilities. All existing solutions require programming parts of the application, and although APIs are available for NUI devices, the applicative programming effort required is still very high, thus requiring professional programmers, and increasing the cost, time to market and reducing flexibility. For example, a public relation (PR) agency may wish to offer its client, for example a sunglasses retailer, an application in which an end-user will select sunglasses from a catalog, and the application will display the user's face as captured by a camera, with the selected sunglasses, without the user actually trying them on or even having them on site. The face with the sunglasses may be presented from any angle, while the person is moving his body or parts of the face, or the like. Once the user selected one or more pairs of sunglasses, he can purchase them. The PR agent may wish to provide another client who may be, for example, a movie producer, with a corresponding application in which a user may virtually become part of a movie scene, interact with the actors and become part of a trailer cast in a themed environment, be shown wearing custom clothing without physically trying the cloths or even seeing the set. The person may see himself in the scene while walking, turning around, interacting with actors or the like.

Currently, developing such applications requires significant programming efforts, which makes such development expensive and time consuming.

Another technical problem dealt with by the disclosed subject matter is the need to use such NUI-related applications with any type of NUI device such as but not limited to cameras, and integrate the behavior of a user with data and features provided by the application or obtained from other sources.

In addition, the NUI devices to be supported by the developed application, such that different types of cameras or computing platforms should not affect the way the application is developed. Rather, the application should function with any NUI device supporting some relevant minimal requirements, without the application developer or designer having to provide specific support for each such device, or computing platforms, such as a smartphone, a laptop, a smart TV, a tablet, a desktop computer, or the like.

For example, in the sunglasses application described above, the player application which presents the user's face with the selected sunglasses should operate seamlessly with any camera, and may even be used by the user at home or on his mobile device.

Yet another technical problem relates to the insufficient usage made of features available in smart TVs. Smart TVs are TVs having embedded therein devices such as cameras, and interactive capabilities. It is required to make use of the interactive capabilities of the smart TVs to embed interactive content associated with the user, within contents which are broadcasted in a uniform manner to multiple users. For example, if an actor in a broadcasted show or advertisement raises his hand, the user may be captured by the camera, and the user's image raising his hand may be displayed on the TV, instead of the actor. In another example, the user may be seen using the advertised item, or the like. Thus, although the same content is been broadcast to all users, each user sees personalized content, by utilizing the NUI devices embedded in the TV or communicating with the TV.

One technical solution relates to a system with two main parts: a computerized application-development platform, and a corresponding player for playing applications developed using the platform. The application-development platform provides for developing NUI applications in a graphic manner and without requiring the developer to program. Such platform enables a content provider such as a PR agent or a client such as a retailer to develop a specific application using the tools and features provided by the platform in an easy and efficient manner, thus reducing costs and time to market, and providing higher flexibility. The output of the working process is one or more applications, or instructions and/or data packages providing the options and/or content of the specific application. The application may utilize existing contents, or links or other references to such contents, such as a connection to a database, and NUI devices for capturing images, gestures, voice, touch, or other input from a user. The application may also use content downloaded from an external source, such as images, video clips, object representations, or the like. The application may then associate the input captured through the NUI device with the content, and enable actions on the input received from the user together with the content.

The application or data packages may then be provided to the customer, for example a retailer. The retailer may put the application to use, for example by his staff, customers, or the like, whether at the business premises or at their homes or other locations.

A user may use the player for playing or executing the application or content package. During execution, NUI devices associated with the used computing platform are utilized for capturing input from the user of the application or the user's environment, performing actions as defined for the application, and optionally connecting the input with content, which may be a part of the application or retrieved before or during execution.

The development platform may contain references to descriptions of one or more body or body parts such as head, hand or others, referred to as NUI objects, and each such NUI object may be associated with one or more tracking points indicated thereon. The development platform may also use references to graphic objects describing objects such as images, illustrations, drawings, audio or video signals, two dimensional representations of physical objects, three dimensional representations of physical objects, or the like. The user, who may be an application designer or an application developer, may associate tracking points on the NUI objects or groups of tracking points referred to as tracking areas with a graphic object. The user may also assign physical attributes to a graphic object and then pin it to a NUI object by using for example pinning points on the graphic object. When the application is later executed by the player, the graphic object will track the NUI object representing the user or body part of the user, in accordance with properties defined for the NUI object, the graphic objects and properties of the graphic objects or parts thereof, and additional factors as detailed below. For example the sunglasses may be defined to track the user's eyes, a bag may be defined to be pinned to a certain tracking point in the user's hand, or the like.

In 3D representations the application designer may import a 3D model with a skeleton or rig aligned with the platform tracking points, for example if the NUI object is a body object, the designer may choose to import a rigged 3D model and align it with all or some of the tracking points.

The user may also define gestures and associated operations using sets of pre-defined commands, referred to as interactive objects, by connecting interactive objects and thus determining the interactive flow of the application, as detailed in association with FIGS. 4A and 4B below.

In some embodiments, the development platform may thus provide a developer with visual representation of the human body or parts thereof, being the NUI object, and options to pre-edit live video in a visual environment.

It will be appreciated by a person skilled in the art that the platform itself, being a development tool, may not refer to the actual NUI objects or graphic objects, but rather to representations of such objects. For example, a developer of the sunglasses application described above may refer to a general object describing a NUI object of type "face" having tracking areas defined thereon, and not to an actual captured face image, and similarly to a graphic object describing a pair of sunglasses and not to a particular pair of sunglasses.

The player application may identify the NUI devices associated with or available to the computing platform on which it is executed, and may determine priorities if multiple devices are available, such that input from one device will be used prior to or instead of input from another device. The player may also be responsible for verifying that all media files required for the application are available, whether as part of the application or from another source, and if not may attempt to download them. The media files may be received from a cloud service in accordance with a distribution profile which may take into account characteristics of the use such as age, geographic location, or the like.

When using the player to execute the developed application, the NUI device may capture the user, and a NUI object may be retrieved therefrom. Locations on the NUI object may then be identified as corresponding to the predefined tracking points or tracking area. It will be appreciated that the tracking area will always remain relative to the pre-defined tracking points, whether the tracking points are visible to the end user or not. One or more graphic objects, such as images, videos, or 3D descriptions of objects may be associated with the NUI object, at the tracking point or pinning points and track the NUI object.

In some embodiments, the player application may be embedded within a broadcast-receiving device such as a smartphone, a smart TV, or the like. The player may be able to activate Automatic Content Recognition (ACR) capabilities executed in the background, for recognition of a specific signal such as sound, video or another signal embedded in the broadcasted media.

Once the signal is identified, the NUI player may be activated, and the NUI device may capture the user or the environment. Nui objects may then be created upon the captured input, tracking can be done and gestures may be identified. Output of the NUI player may then be embedded within the broadcasting. For example, in an advertisement for sunglasses the user may select pair of sunglasses from several options, and may be viewed with the selected sunglasses as part of advertisement. In another example, the user may see himself as part of an advertisement, for example as though he or she appears on TV news, posters, bus advertisement, newspapers, or the like.

In another example, when watching a training program the user may see himself training side by side with the trainer, and may be congratulated when keeping proper posture or rectified when losing posture.

Alternatively or additionally, gestures by the captured NUI object may be used for retrieving and transmitting information. For example, voting for a participant may be done by instructing the viewers to face the capturing device, and raise their right hand for participant number one, and their left hand for participant number two. Thus, NUI-related functionality may be provided during passive broadcasting in smart TVs, such that the captured user may be integrated into the media, or gestures by the user may be captured, analyzed and reported to a destination, for example a polling center collecting interactive votes.

Projected surfaces may be useful in immersing a user in an interaction and thus enhancing the NUI interaction, due to of their flexibility and possible sizes. For example, there may be a floor projection set-up, representing a top view of a sea shore, and the user may be encouraged to play interactive hopscotch on the sand. When the user jumps on a square it will be recognized by the camera and the projection may leave a representation of the user's foot print. Alternatively or additionally, the user may be encouraged to perform writing movements on the "sand" which may be erased by the "sea" when a new user is identified. In another example a 3D projection of a lion statue may be created, such that if a user caresses the lion statue, the gesture may be recognized and a purring lion animation may be projected, thus simulating live to on an inanimate object. This may be done by pre-recording the lion as a NUI object in the platform, such that the player may be able to recognize the user touching the object through the camera without any additional touch sensors.

The player may also enable the creation or usage of a user profile, comprising for example data such as age, preferences, geographic locations, demographic information or others, upon which certain content items may or may not be enabled, suggested, or the like.

One technical effect of the disclosed subject matter relates to providing a tool for easy development of applications that make use of NUI devices, and adding functionality associated with the devices. The applications may be developed in a graphical manner without requiring programming, and regardless of which NUI devices are to be used in conjunction with the application. Using the platform, application development becomes intuitive, easy and fast, and may be done by content specialists and not only by programmers, thus reducing costs and time to market. Multiple applications may thus be developed, which combine NUI objects based on captures by NUI devices, and graphic images or other content.

Another technical effect of the disclosed subject matter relates to using, executing, or playing the applications developed on the platform. The applications may make use of any type of NUI device, and may provide the user with multiple options currently unavailable, such as seeing what a garment looks on the user from the comfort of his or her home and without having the actual garment.

Yet another technical effect of the disclosed subject matter relates to utilizing the capabilities of smart TVs or other devices receiving broadcasting, for embedding NUI content into the broadcast content, or alternatively receiving information from the viewer using a NUI device, and reporting it back.

Referring now to FIG. 1, showing a block diagram of the main components and flow in providing and using a platform for developing NUI applications.

A user such as a programmer 104 is using a computing platform 108 to design and implement a development platform 110 for developing NUI applications, and a corresponding player 112 for executing the developed applications.

Development platform 110 and optionally player 112 may be provided to another user, such as a content specialist 114, using a computing platform 116 to execute platform 110 and create an application 122. Application 122 may be specific to a certain domain, a certain vertical, or it may be more generic. Programmer 104 or content specialist 114 may store content such as graphic objects into storage device 124 which may be implemented as any persistent storage, including for example a cloud server which may use a communication channel 136 such as Local Area Network (LAN), Wide Area Network (WAN) or the like. Content may also be stored on storage 124 by other users or programs.

Application 122 as well as player 112 may be provided to an end user 126 using a computing platform 128, equipped with a NUI device such as camera 132. Computing platform 128 may be in direct or indirect communication through channel 136 with content from storage 124 and may retrieve content therefrom. End user 126 may then operate player 112 to execute application 122 which may make use of NUI device 132, such as a camera. Thus, end user 126 may use the application, for showing input captured from end user 126 interacting with graphic objects or other data which may be retrieved from application 122 or from storage 124.

For example, application 122 may be the sunglasses application described above, having being developed using platform 110, while descriptions of the actual available items may be stored on storage 124 by a retailer, and may change from time to time. However, descriptions of items may also be embedded or stored within application 122.

End user 126 may use application 122 to select sunglasses, and see on a display device associated with computing platform 128 what the sunglasses look like on his face as captured by camera 132. End user 126 may use application 122 in a retail location or from his home. Once end user 126 is done, he or she can order the selected sunglasses, without having actually seen them before.

Figure 2:
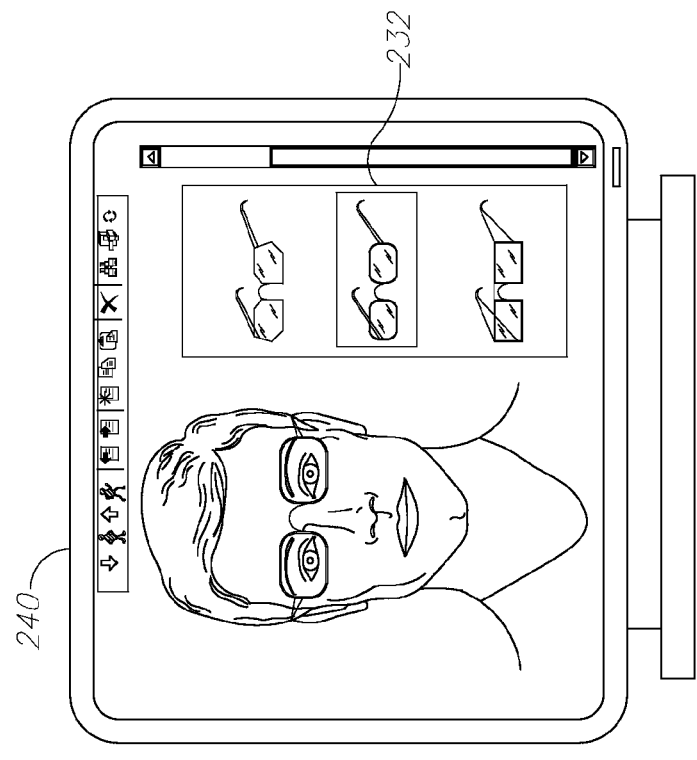
FIG. 2 is an exemplary illustration of a user using a player playing an application developed by the platform, in accordance with some exemplary embodiments of the disclosed subject matter.
Figure 2:
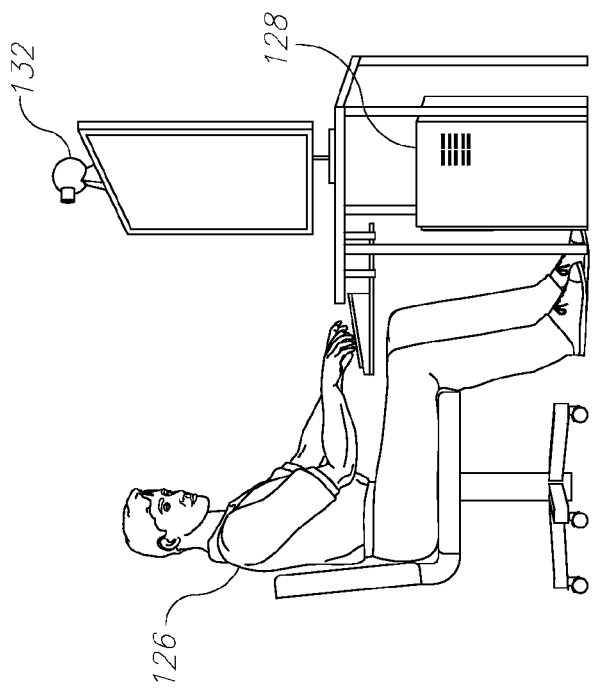

Referring now to FIG. 2, showing an exemplary illustration the sunglasses application developed using the platform, when in use. User 126 may start the player application on a computing platform 128 associated with a display device. The exemplary application comprises a sunglasses selection 232. The computing platform is associated with a NUI device, and particularly a camera 132, which captures the user's face. Pane 240 displayed on the display device shows the user's face as captured by camera 132, with the selected pair of sunglasses on. If the user turns his or her head, the image displayed on pane 240 turns too, together with the sunglasses. If the user selects another pair, the user's face is displayed with the other pair.

It will be appreciated that this application is exemplary only, and many other applications may be designed and developed. It will also be appreciated that the applications are not limited to clothing and accessories and may be used for multiple other purposes, such as sports, dancing, museums, games, digital signage, education, advertising or others.

Figure 3A:
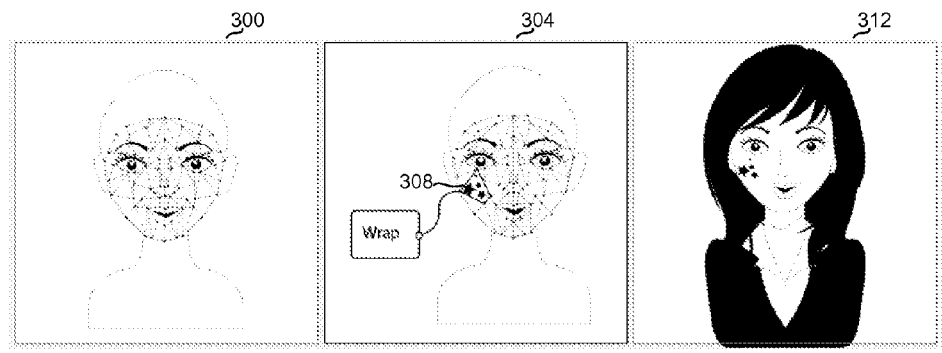
FIGS. 3A-3C are illustrations exemplifying the usage of tracking points and tracking areas, in accordance with some exemplary embodiments of the disclosed subject matter.
Figure 3B:
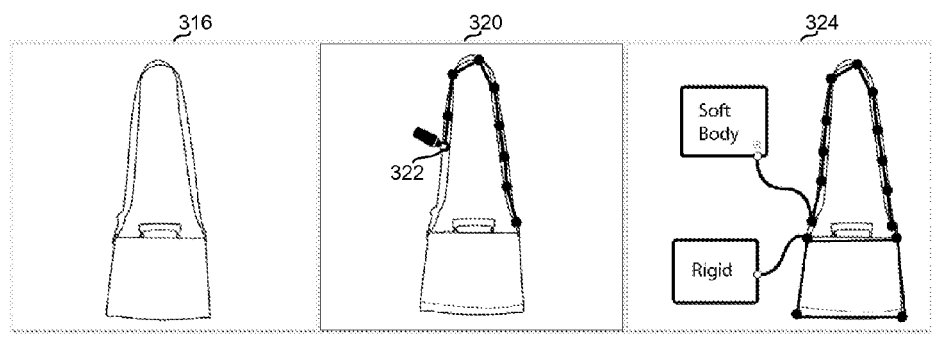
Figure 3C:
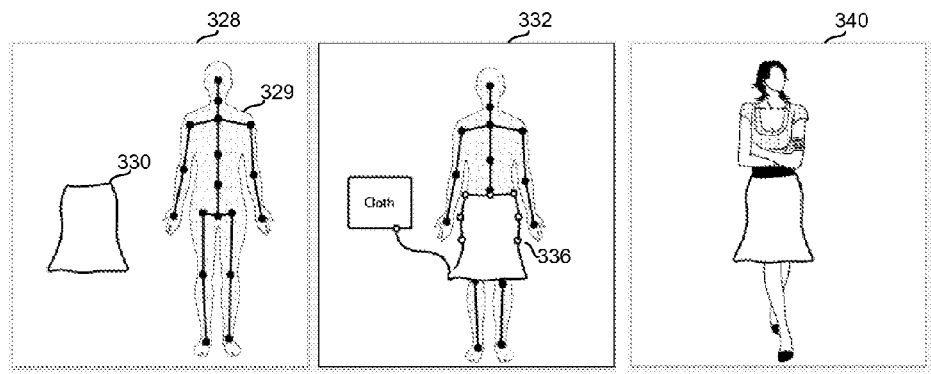

Referring now to FIGS. 3A-3C showing illustrations exemplifying the usage of tracking points on a NUI object.

In FIG. 3A, illustration 300 shows a general structure of a face NUI object, with multiple tracking points defined thereon. Illustration 300 may represent a NUI object of type "face", and may be displayed to an application designer using the application development platform. In illustration 304, some tracking points may be grouped together during the application development into tracking area 308, and a graphic object of an image of stars is associated with tracking area 308.

In some embodiments, the NUI object and the tracking points may be predefined as part of the development platform. Thus, a development platform may be provided with a multiplicity of NUI objects such as "face", "body", "hand", or others, each associated with a multiplicity of tracking points.

When the application is played or executed by a player, the user's face may be captured by a NUI device such as a camera, the locations corresponding to the tracking points may be identified, and the user's face may be displayed with the stars image being displayed on the area corresponding to tracking area 308 as shown in illustration 312.

In FIG. 3B, illustration 316 shows a general structure of an image of a bag as may be displayed during the development of an application, to an application designer using the platform. Illustration 320 shows the general structure of a bag with points defined thereon, such as physical point 322. Illustration 324, still associated with the development of the application, may indicate some of the points on the bag as soft and others as rigid, which will determine the way the object is displayed in the player, when a tracking point of a NUI object which is pinned to any of the physical points when moved.

FIG. 3C presents three illustrations. Illustration 328 Includes a NUI object 329 of type "body" with a multiplicity of tracking points defined thereon, and a graphic object 330 being an image or a representation of a skirt. In illustration 332, points are defined on the skirt, some of which such as point 336 or other hollow points may be defined as pinning points which are to be attached to a tracking point or reference point, for example the hollow points in the skirt are intended to be attached to the hip areas, while unattached areas may be defined to be illustrated as moving freely in accordance with gravitation, acceleration or other forces caused by movements of the NUI object to which the graphic object is attached.

Illustration 340 may be shown during execution of the application, and shows the body of the particular end user as captured by a NUI device, with a particular skirt. The displayed skirt is indeed attached to the body in the hips area, while the lower parts of the skirt move freely. When the user moves and is captured by the NUI device, the cloth parts of the skirt may move freely as an actual skirt may move due to gravitation, while the areas associated with the hollow points 336 are continue to be attached to the hips.

Figure 4A:
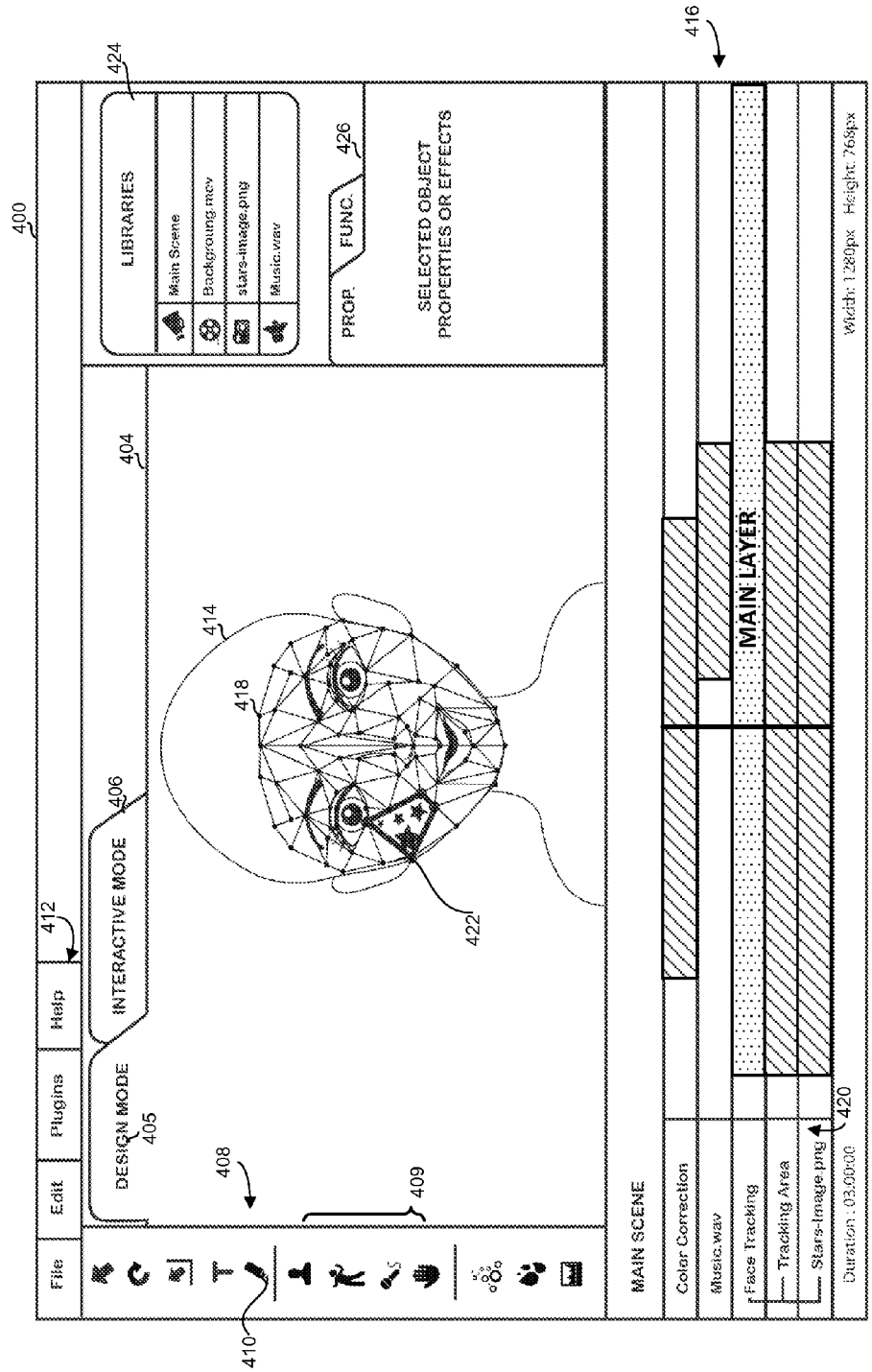
FIG. 4A is an exemplary screenshot of the platform for developing NUI applications, in design mode, in accordance with some exemplary embodiments of the disclosed subject matter.
Figure 4B:
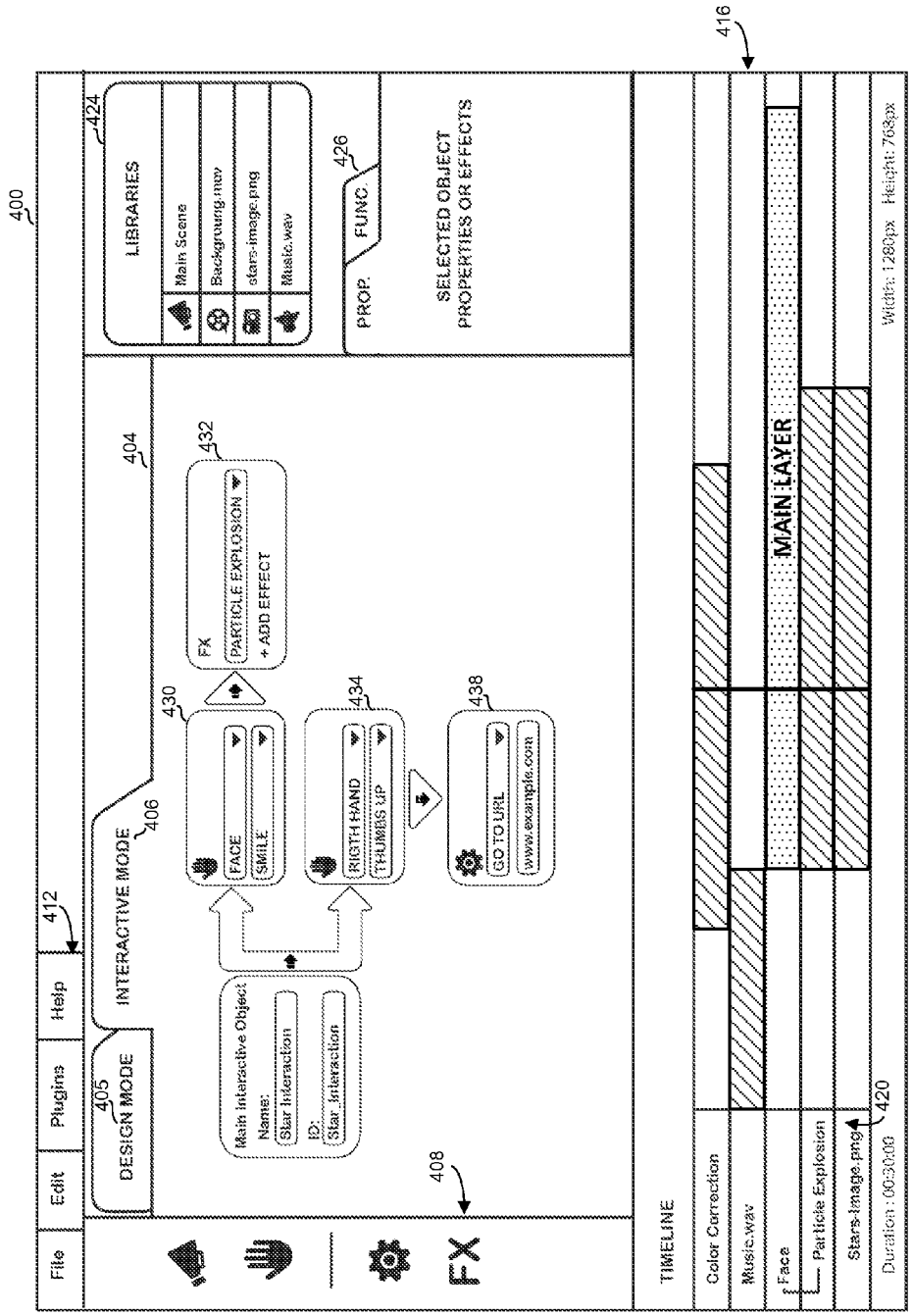
FIG. 4B is an exemplary screenshot of the platform for developing NUI applications, in interactive mode, in accordance with some exemplary embodiments of the disclosed subject matter.

Referring now to FIGS. 4A and 4B, showing illustrations of exemplary screenshots of a platform for developing NUI applications.

The platform may be displayed as one or more windows 400 displayed on a display device, and can be operated on using any input or output devices, such as a keyboard, mouse, touch screen, joystick, or any NUI device.

The platform is an easy and intuitive tool for creating interactive media content applications. The platform unifies all NUI devices and technologies into one environment with clear and easy interface that does not require programming.

Window 400 may comprise main graphic working pane 404, representing the main stage on which the developer develops the application. Pane 404 is detailed further below.

Window 400 may also comprise a general menu 412 containing commands which are common to most applications, such as "File", "edit" or the like.

Pane 404 may comprise two main tabs, providing different modes: design mode reached by clicking or otherwise activating tab 405, and interactive mode reached by clicking or otherwise activating tab 406.

In design mode the developer selects graphic objects or NUI objects to be used in the application, and in interactive mode the developer builds the interactive process and the flow of the application.

Window 400 may comprise a tools menu 408, from which the developer can choose tools and utilities to be used in the application, such as voice, gestures to be recognized, or others. The tools may be used for associating NUI capabilities with media objects, assigning physical properties to graphic objects or parts thereof, or the like. For example, tool 410 may enable a developer to add pinning points to graphic objects in order for the graphic object to follow a tracking point of a NUI object. During execution, the tracking point will be determined on the NUI object, and a graphic object will be associated with the tracking point, such that the graphic object will track the location of the tracking point, in conformance with physical properties. For example, a rigid body may assume a non-vertical position when held up, while a soft body may not. Tools menu 408, may show different sets of tools depending on the mode being used. For example if interactive mode is selected the tools provided may represent a variety of interactive objects which the user may drag onto the scene such as action interactive object, gesture interactive object, properties interactive object, effects interactive object and the like.

In some embodiments, icons 409 may represent objects that can be dragged to pane 404 and implement functions such as particles, tracking, color correction, liquifying, or the like. Such object, when dragged into pane 404, may become a graphic object that can track a NUI object. Particle tracking may represent the behavior of particles in general, wherein different base objects may be used for each particle. Thus, the stars in FIG. 4A may be replaced with particles of another shape without affecting their behavior.

Yet another area of window 400 is timeline 416, which is organized by layers and presents objects 420 which participate in the application, including NUI objects such as faces, graphic objects such as images, other objects such as music objects, or the like. Each layer may contain one or more objects and may also be represented as a tree and may contain interactive objects or actions, as well as sub-layers and may enable performing operation on sub-layers.

Each layer may be indicated by a different color or pattern, and each layer may be hidden or visible. The layers order may also be determined giving a visual representation of their position on the stage. For example, a layer that contains an object that may be hidden by another object associated with another layer, may appear higher in the list of layers of the timeline than the other layer. In a similar manner, sub layers of a particular layer may appear under that layer in the timeline area. For example, if the main pane shows a flower and a bee, it may be designed that the bee may hide the flower but not the other way around, so the layer containing the bee will be higher in the list than the layer containing the flower.

The main layer may be represented as an ancestor node in a hierarchy in timeline area 416 detailed below, and each object placed on it may be represented as a descendent node or a sub layer. For example the glasses image will be a sub layer of the NUI object face and thus be tracked accordingly.

The application may be developed of one or more scenes, wherein each scene may contain one or more layers in the timeline, each layer representing an one or more objects, and may be limited or unlimited in time, for example, the interactive part in a TV commercial may be limited to 5-30 seconds. Window 400 may also comprise a scene manager (not shown), which may be a part of the library, for managing, associating and creating the various scenes. A project may be divided into a multiplicity of scenes, which provides logic separation and thus also enables concurrent work by multiple developers on the same project. Various scenes may be associated using for example an action interactive object (described below).

A scene may also be defined on the timeline to be in a "loop" state in which it is played repeatedly until stopped by the user or by a command. For example the designer may determine that a specific gesture may trigger an action interactive object, which that may switch the application to a different scene and thus end the loop.

In some embodiments, the platform may also enable Automatic Content Recognition (ACR) capabilities, for activating the application based upon the recognition of a specific sound, video or another signal, which can be used for activating NUI-related media during passive broadcasting in smart TVs.

For each object, it may be indicated on which parts along the timeline of the application it is active. The application designer can manage and associate objects in a graphic manner over a layer-based timeline. The timeline may be arranged in layers, wherein each layer may be associated with one or more layers.

Window 400 may also comprise one or more libraries 424 of available objects, gestures, graphic objects, sounds, scenes or others. Each of the available NUI objects and gestures may be associated with the relevant NUI devices. For example, a gesture of moving a hand from left to right may be enabled for all devices which capture video or other image streams and recognize hand gestures. The graphic objects may include a collection from any media, such as images, animations, audio files, video files, object representations, or others. In some embodiments, each object may be associated with one or more properties. Library 400 may be displayed in a variety of ways, including showing all objects, only objects of particular type, or the like.

For each object, its properties, physicality, or available effects may be observed or changed at area 426.

FIG. 4A shows pane 404 in design mode, wherein pane 404 displays the NUI objects, graphic objects or representation thereof, where the user may define tracking areas, pinning points, designs the graphic background, actions enabled for the end-user, or the like. If the main layer in the timeline contains a NUI object, the NUI object may implement by default the tracking action, such that an object placed on this layer will automatically track the tracking points of the NUI object connected to it. The application designer may perform graphic operations on objects such as resizing, moving, rotating, or others. One or more characteristics may change along the timeline, for example the size of an object may be defined to change gradually from time point $T_1$ to time point $T_2$. The platform provides for connecting and associating the graphic interface and NUI capabilities. Using the platform, the developer may define which options may be enabled depending on the NUI devices available to the end-user, and their prioritization. For example, the application may be defined to prioritize working with hand gestures, but if no camera is available, it may operate upon voice commands. The available operations may also be determined in accordance with the end-user, based for example on age, usage type, privileges, preferences, or the like.

Face image 414 represents a NUI object of type "face", point 418 is a tracking point on NUI object 414, and stars 422 represent a graphic object which may have been created by dragging a stars image and connecting it to a tracking area.

Thus, when a developer is implementing a tracking action of a graphic object after a NUI object, the developer may start by selecting the NUI object to be tracked, and indicate one or more tracking points on the NUI object. A multiplicity of tracking points may be grouped into a tracking area.

The user may then select an object from the library 424 and drag it or otherwise connect it to the tracking area. The application designer may define one or more pinning points on the graphic objects, such as point 336 of FIG. 3A. A pinning point indicates a point in the graphic object to be attached to a tracking point or tracking area in the NUI object, while unattached areas in the graphic object may behave in accordance with their physical properties. For example, in FIG. 3C the skirt will cling to the body at the hollow points, while the rest of the cloth will fall down due to gravity even if the wearer is in a non upright position.

In design mode the user may define a set of one or more tracking objects in relation to the NUI object. For example, if a hand holding a bag is raised, the bag is lifted. When any of the gestures is identified in the data captured by the NUI device, the attached graphic object tracks the NUI object and behaves in accordance with its physical properties. In another example, the user may define that the sunglasses hide part of the face, while some parts of the sunglasses may be hidden by the user's ear, or the like.

Physical properties such as softness or rigidity degree, being in a liquid state, being made of cloth, or others, may be attributed to a graphic object or parts of the object, using physicality points as shown on FIG. 3B and further described in 526 of FIG. 5 below. Each physical attribute may have relevant properties and parameters that give the object its physicality. For example, if the physical attribute of cloth is selected, the options may include elasticity, density, thickness, tear factor, self-collision, or the like. If a rigid body is selected, the options may include velocity, density, bounciness, elasticity, and such. Physical forces such as wind, gravity, friction, magnetism or others may also be defined for objects or for scenes. This allows creating scenes that mimic reality, for example a user may see himself holding balloons in a windy scene, when the user releases the balloons they will fly according to the wind direction, the gravity, and the density of the balloons. Another example the user may see himself in a pool full of bouncy balls, where the kinetic energy of the user's movements and the bounce-related properties of the balls may create a chain reaction and make the balls move as they would in a real ball pool.

Certain effects can also relate to physical properties, for example if the described balls were particles, then the particles would fly according to their physical attributes and the kinetic energy applied to them by the user. Effects such as particles, vortex, stroke, smudge, reveal, or others may react to movement. In another example a user may be encouraged to "clean" a window and thus revealing the room behind it, which may be done by the application designer by placing a dirty window object on top of a clean window object, and applying the reveal effect on the dirty window.

In design mode, effects may be applied to graphic objects, NUI objects or tracking areas. The application designer may for example want to enlarge the user's eyes, for which purpose he may use liquify effect on a tracking area he previously defined around the eyes. In another example the application designer may want to cartoonize the user, for which effect he may need to use more than one effect for example he may use stroke or edge for making sharp lines and posterize for colorizing the image and thus achieving the desired cartoon effect.

The platform may also support object recognition, in which case after recording an object as described below in association with gesture manager 540 of FIG. 5, it may act in the platform as a NUI object, allowing the user to add tracking points, tracking areas, pinning points or the like to the recorded object. This may be especially useful for advertisers, for example an advertiser may want to do a raffle in which only the users holding certain product may enter the competition. The application designer may choose to record the product, and when the object is recognized it may be enlarged or otherwise enhanced, the user may be thanked for entering the competition.

FIG. 4B shows pane 404 in interactive mode, in which the interactions in the systems are defined, using objects that may be selected and embedded in the process. The exemplary application of FIG. 4 relates to an advertising campaign which encourages viewers to smile, thus triggering a particle explosion behind the viewer's image as part of the advertisement. The advertiser may also want to bring traffic to his website and so when a gesture of "thumbs up" is performed, the viewer may be taken to the company's website. For example, pane 404 shows gesture interactive object 1 (430) which may be defined as a face NUI Object, and the selected gesture in this case is a smile. An effect interactive object 432 is connected to NUI object 1 (430), both of which may have been defined in design mode. Once the application is executed, when the user smiles, the particle explosion effect will take place. Gesture interactive object 2 (434) represents a right hand NUI object, and the selected gesture in this case is a "thumbs up" gesture. Gesture interactive object 2 (434) is then connected by a parallel or fork connector to an Action Interactive Object (438) which will direct the user to the advertiser's website, when the gesture is detected, the developer may select one or more supported gestures for each NUI object, and one or more associated action objects for each graphic object. In interactive mode, interactive objects may be connected by an ancestor node hierarchy into a set of interacting or interdependent actions forming an integrated interaction. Objects used in interactive mode may be defined by the main layers in the timeline, which may be represented by combining one or more connected objects which were placed on the main layer in design mode. A user may define which layers are relevant to a specific interaction, thus allowing for multiple unconnected interactivities within one scene by defining one or more main layers with their respective sub layers.

An interactive object may describe an action in a chain of actions which are activated upon entities connected to it, such as NUI objects, graphic objects or other interactive objects, creating this chain of actions may be performed graphically by selecting the desired commands relevant to the interactive object type, and connecting the different types of interactive objects using the appropriate connector. An interactive object may contain specific preprogrammed commands, which may depend on the type of interactive object and the specific properties and selections. Interactive objects may be concatenated to other Interactive objects in a flowchart-manner. Unlike traditional systems, in which each node is associated with a single command or attribute, such that the user has to remember a large amount of such commands and understand the logic and possible functionality of each command, using interactive objects having preprogrammed chains of commands, different connector types, filtered options and suggested sequence significantly eases such task.

The interactive objects may be of various types, such as but not limited to:

A main interactive object, which may be used as a starting point of any interaction; it contains the interaction properties like the name, ID, and such.

A connector object may operate on other interactive objects, and connect them. For example, an optional/selection connector enables the selection between two or more interactive objects, a parallel or fork connector enables the connection of a multiplicity of parallel interactive objects, an "and" or "+" connector enables adding interactive objects in a serial manner to create extended conditions, a funnel connector enables the connection of two or more interactive objects to a single interactive object or the like. These combinations allow the application designer to create conditional statements between interactive objects such as: if-then, case, if-or, if-then-else, if-and, if-and-only-if, etc. and any combination, by using different connectors. Connectors may also contain certain functionalities that may be defined in the properties panel, such as randomize, sequence, queue, or the like.

In Interactive mode the user may define a set of one or more gestures supported by the NUI object, such as, turning around, raising a hand, smiling, or the like, and the behavior of a graphic object attached to the NUI object due to such gesture. For example in the glasses example described above, if a viewer moves his hand in a waiving gesture the sunglasses menu will slide accordingly but when the user makes a pushing gesture the relevant pair of glasses will be selected and placed on the users face. When any of the gestures is identified in the data captured by the NUI device the Interactive Objects will behave in accordance to what the media creator predefined.

A gesture interactive object may enable the selection of a gesture performed by a NUI object or provided by a sensor card, whether the NUI object is placed on the stage or selected through the gesture interactive object. For each gesture interactive object, the application designer may select a NUI object and a relevant gesture to be performed by the NUI object. For example, if a NUI object of type "hand" is selected, the listed options may include clapping, waving, thumbs up, guns up, clenched fist, swipe, or the like. If the listed gestures are insufficient, the user may record additional gestures as described in association with FIG. 5 below.

Properties interactive object enables to set or change characteristics of an object connected to it. Different properties options may be provided, depending on the selected object type. For example sound objects may have volume and mute options, while graphic objects may have size, visibility, position, opacity, or other options. Characteristics may change along the timeline, for example the size of an object may be defined to change gradually from time point $T_1$ to time point $T_2$.

Effects interactive object enables the selection of one or more effects to be activated upon an object during or triggered by an action or a gesture. Effects may include, for example, blur, color correction, particles, liquify, posterize, stroke, halftone, procedural disintegration, fractal noise, shattering, reduce noise, or the like.

In some embodiments, the properties or effects may be defined using properties or effects tabs 426.

Action interactive object enables the performance of actions such as transition between scenes, switching to specific time on the timeline, browsing to a web page, capturing image, uploading to or connecting with web services, social networks, or the like.

Each such interactive object may be connected to any other interactive object, and the relevant interactive objects may be suggested as options for connection to any other object. For example, after the main interactive object, an input object, such as a NUI interactive object, may be suggested, followed by a connector, and further followed by output, such as effect or properties, and so on.

An application designer may thus choose objects, choose points for associating objects, define which gestures are to be recognized for NUI objects, change the behavior of certain objects along the time-line or the like.

It will be appreciated that window 400 and the associated features are exemplary only, and other designs may be used. For example, the application may be designed without a timeline, and to behave only as an event-driven application.

Figure 4C:
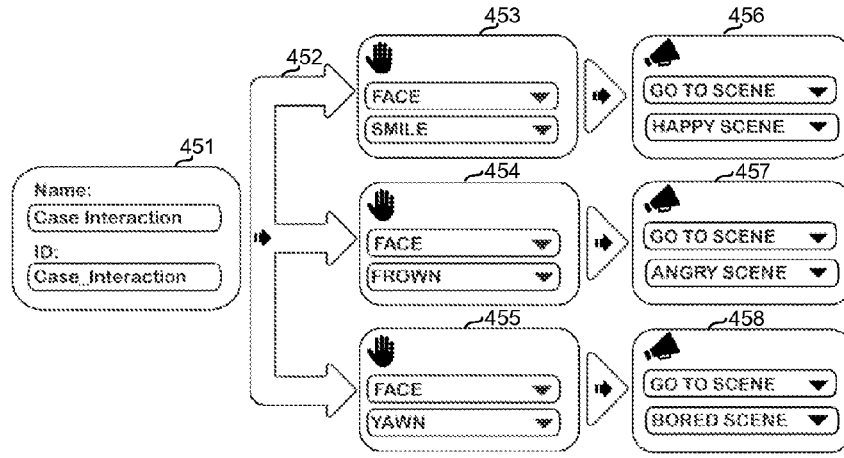
FIGS. 4C-4E are exemplary illustrations exemplifying the usage of interactive mode in developing NUI applications, in accordance with some exemplary embodiments of the disclosed subject matter.
Figure 4D:
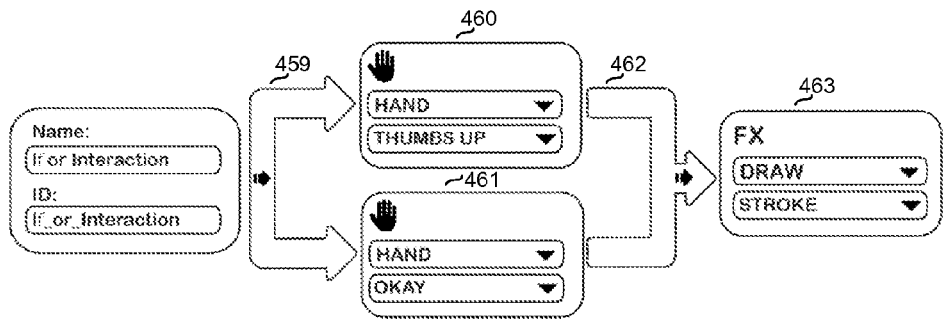
Figure 4E:
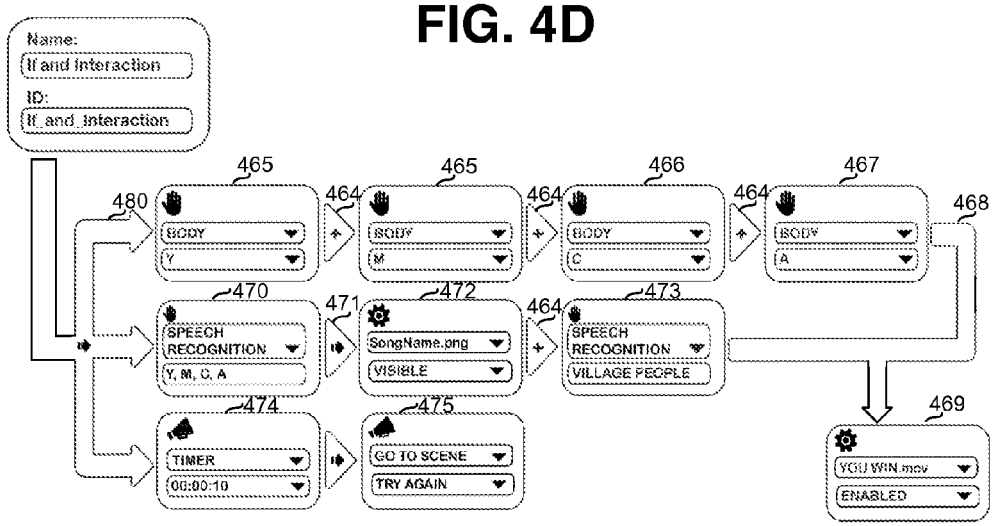

Referring now to FIGS. 4C-4E, showing exemplary applications using the interactive mode to create interactions using some well-known conditional structures such as: case, if-or, if-and, etc. Connectors may be used to create an unlimited amount of application structures, and scenes may be used to further expand interactions.

The exemplary application shown in FIG. 4C relates to an interactive art piece, containing a "case" structure in which the application reacts according to the user's mood, thus triggering different scenes when different facial expressions are detected. In this example a main interactive object 451 may be described as the starting point of any interaction, is concatenated by a parallel or fork connector 452 to three different gesture interactive objects 453, 454, and 455 all of which are defined as a face NUI object with a desired gesture differing between the objects. The selected gestures in this case are a smile for object 453, a frown for object 454, and a yawn for object 455. Each gesture interactive object is then connected to a respective action interactive object, all of which are defined to be a GO TO SCENE action, which will direct the end-user to different scenes according to the gesture detected. If object 453 associated with a smile is detected, the application will switch to a happy scene as defined in happy action interactive object 456, if object 454 associated with a frown is detected, the application will switch to an angry scene as defined in angry action interactive object 457, and if the user yawns the application will switch to a bored scene as defined in bored action interactive object 458. Each scene may contain further interactions, thus dividing large interactions and their respective graphic objects to smaller and more manageable interactions.

Referring now to FIG. 4D, showing an "if or" conditional structure. The user may want to create an educational application featuring Duchamp's work, and in particular a scene on the application may be Duchamp's L.H.O.O.Q. in which the media creator may want to encourage users to "draw" a mustache on top of the Mona Lisa, when recognizing one of few gestures the user may use when ready. For this purpose a parallel connector 459 may be connected to two gesture interactive objects 460 and 461. Hand with thumbs up gesture interactive object 460 may be defined as a hand NUI object with the defined gesture being thumbs up, while hand with OK gesture interactive object 461 may also be defined as a hand NUI object but in this case the selected gesture is an Okay gesture, for example connecting the thumb and the forefinger. Both interactive objects 460 and 461 may then be connected by a funnel connector 462 to a single effect interactive object 463. Effect interactive object's 463 first selection refers to a layer named "draw" in which the effect takes place, and the second selection is the stroke effect which was previously defined by the user on the "draw" layer in design mode. Since stroke effect may react to movement, the user will be able to draw the Mona Lisa's mustache using hand movements.

Referring now to FIG. 4E, relating to a musical quiz in which the user has to recognize a song, such as the YMCA song and the band name, or make a series of moves associated with the song to win. If no appropriate action is detected in 10 seconds, the player may lose the game. For this purpose two different "if-and" conditional structures may be used. A parallel or fork connector 480 is connected to a gesture interactive object 465 which may be defined as a body NUI Object, and the selected gesture in this case is a pre-recorded gesture named "Y" which is then connected by a plus connector 464 to the next gesture interactive object 465 in the sequence in which the selected gesture is the predefined "M" gesture, this is then connected to another plus connector 464 which is consequently connected to a third gesture interactive object 466 which may be defined as a body NUI Object, and the selected gesture is predetermined "C" gesture 466, which is again connected to yet another plus connector 464 in the chain, which is then connected to a gesture interactive object 467 and the selected gesture is predefined "A" gesture, which is then connected to a funnel connector 468 which represents the end of the sequence and is finally connected to a properties interactive object 469 which will enable playing the "you win.mov" file when the sequence of gestures Y,M,C,A is detected in that specific order, following a nested chain of "if" statements. Parallel or fork connector 480 may be further connected to a gesture interactive object 470 in which a speech recognition NUI object is selected which is designed to recognize a user saying "YMCA". Object 470 is then connected through connector 471 to a properties interactive object 472, in which the first selection refers to the layer named "SongName.png", which is an image object defined as visible, such that when the name of the song is articulated, the image SongName.png becomes visible. The properties interactive object 472 is then connected by a plus connector 464 which nests the first if-then statement, moving to the next gesture interactive object 473 defined as a speech recognition NUI object in which the text to be recognized is the band's name "Village People", which is then connected to a funnel connector 468 which represents the end of the sequence and is connected to a properties interactive object 469 which will enable the "you win.mov" file. Thus, after the user has guessed the song name, has seen an image confirming that he is correct, and correctly guessed the band name's the user may win. Funnel connector 480 may also be connected to action interactive object 474 which is defined as a timer, in which the selected time is 10 seconds, which is then connected to another action interactive object 475 which is defined as a go-to-scene action, directing the end-user to a "try again" scene after 10 seconds, if no other interaction is triggered first.

The properties in each properties interactive object and effects interactive object may be controlled through the properties and effects pane respectively. The selected layers and desired effects may be selected through the interactive object, but the properties of such objects and effects, may be controlled through the properties and effects pane, which may be done to prevent clutter in the interactive objects, as objects and effects may have many properties.

Figure 5:
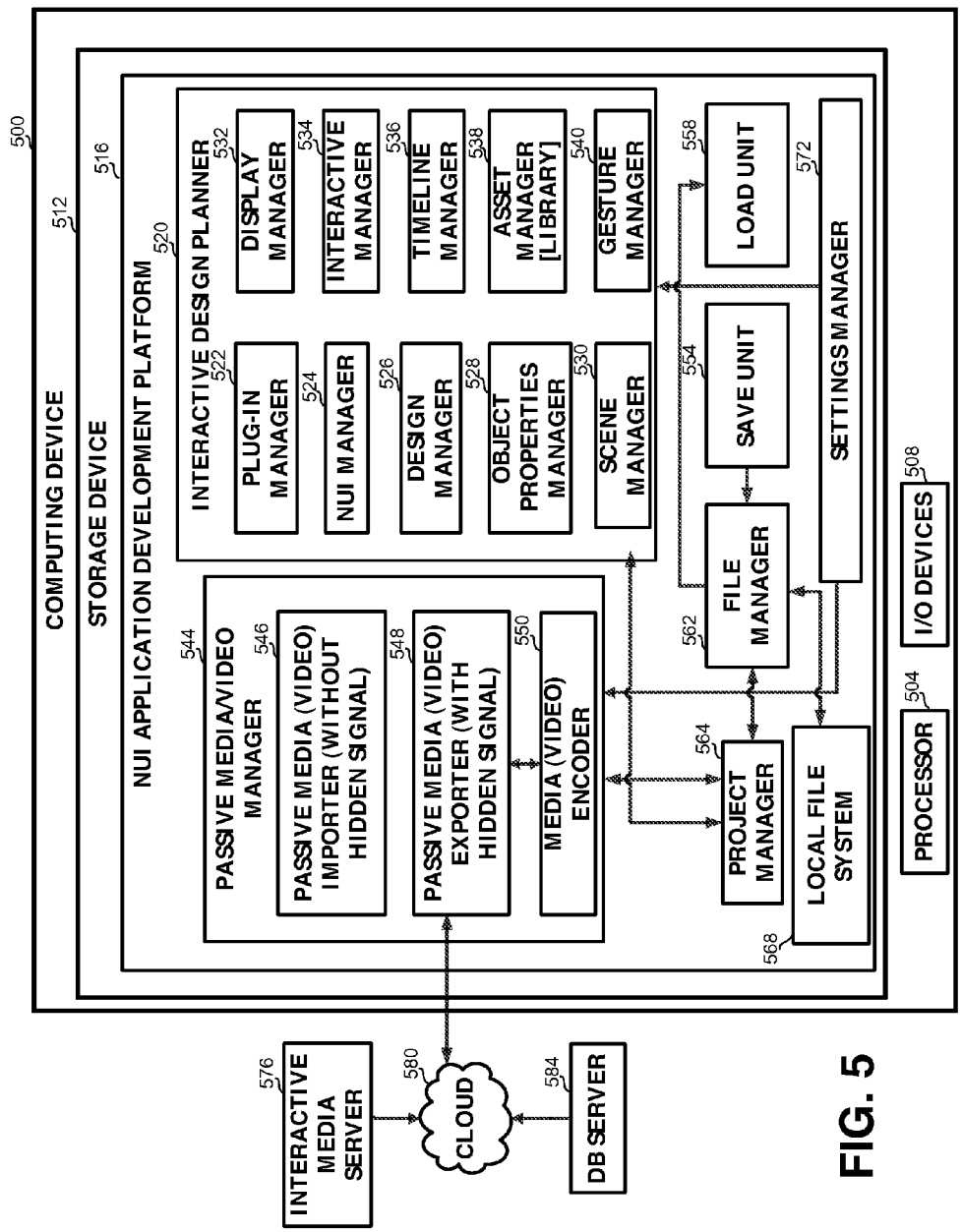
FIG. 5 is a block diagram showing the components of a platform for developing NUI applications, in accordance with some exemplary embodiments of the disclosed subject matter.

Referring now to FIG. 5, showing a block diagram of an apparatus for developing NUI applications.

The apparatus may comprise a computing platform 500. Computing platform 500 may comprise a processor 504. Processor 504 may be a Central Processing Unit (CPU), a microprocessor, an electronic circuit, an Integrated Circuit (IC) or the like. Alternatively, computing platform 500 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processor 504 may be utilized to perform computations required by computing platform 500 or any of it subcomponents.

In some embodiments, computing platform 500 may comprise an input-output (I/O) device 508 such as a terminal, a display, a keyboard, camera, sensor, an input device or the like, used to interact with the system, to invoke the system and to receive results.

In some exemplary embodiments, computing platform 500 may comprise one or more storage devices such as storage device 512. Storage device 512 may be persistent or volatile. For example, storage device 512 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 512 may retain program code operative to cause processor 504 to perform acts associated with the development platform.

The components detailed below may be implemented as one or more sets of interrelated computer instructions, executed for example by processor 504 or by another processor. The components may be arranged as one or more executable files, dynamic libraries, static libraries, methods, functions, services, or the like, programmed in any programming language and under any computing environment.

Storage device 512 may comprise local file system 568, responsible for maintaining the files associated with the platform, including creating, saving updating, or the like.

Storage device 512 may also comprise a NUI application development platform 516, for providing a developer with a framework and tools for developing NUI applications without programming.

NUI application development platform 516 may comprise interactive design planner 520 which provides the framework for planning and designing interactive NUI projects, as shown for example in FIGS. 4A and 4B above.

Interactive design planner 520 may comprise plug-in manager 522, responsible for managing external software components which may be integrated into the system and may provide functionality extensions. Using plug-in manager 522 the application designer may control the loading and usage of such extensions. Exemplary plug-ins may include special effects, external gesture libraries such as sign language, predesigned interactivities such as a carousel menu, a plug-in that makes any camera a depth camera, compatibility to an unsupported device, or the like.

Interactive design planner 520 may comprise NUI manager 524 responsible for defining the NUI devices to be used and supported by the developed application. NUI manager 524 may interact with the device drivers and may be responsible for the communication between the NUI objects to be defined in the system and the NUI devices expected or required to be available when the application is to be executed.

Interactive design planner 520 may comprise design manager 526, responsible for creating and visually managing the design in a scene, by managing different graphic and non-graphic objects and their relation to each other in the scene and on the timeline, by selecting objects and definitions for planning the tracking activities, and for associating NUI objects and other objects. When an object is placed onto a scene or timeline it may automatically inherit a relevant list of attributes such as width, height, depth, position expressed for example in x, y, and z coordinates, rotation, color, visibility, or the like. For example, after an image is dragged onto a scene, its position may be taken from the mouse coordinates, while taking into account the screen resolution and ratio. The user may change such attributes using the appropriate tool from the tool box such as drag, scale, rotate, or others, or by changing the object properties. Visual representation of properties, physicality and special effects which may be attributed to graphic objects, NUI objects, tracking areas or others may also be managed through design manager 526.

The objects and their attributes may be saved as data structures, and later exported as a markup language file containing all objects in stage and their properties, effects and physicality attributes. The data may later be decoded by a player when the application is executed, as detailed in association with FIG. 6 below.

Design manager 526 may be used for indicating a NUI object and a graphic object, such that the graphic object is designed to track the movements of the NUI object, based on movements of an object captured by a NUI device and associated with the NUI object when the NUI application is executed. The object may track the NUI object with the respective properties managed by the items properties manager 528 detailed below, and act according to physics laws or specific effects.

For the tracking effect the user may link the graphic object to the NUI Object by simply dragging the object to the desired position in relation to the NUI object, through layer hierarchy or using tracking, pinning and physical points and areas as shown above in association with FIGS. 3A-3C and 4A. The tracking may also be defined by creating a coordinate system which contains predefined key points that form the different NUI objects. Such points defined by the user may also act as tracking or pinning points. Tracking or pinning points may be joined together to create tracking areas, which may later be used in tracking the movement of a NUI object. In some cases, reference points may be needed when the predefined NUI object's points are insufficient. Reference points may be defined as the center of mass of the selected area, or the selected point itself in relation to the NUI object. This may be done by calculating the position of the point on each frame, depending on the new positions of the predefined points of the NUI object received by the NUI device.

For example, denote by $(x_1,y_1,z_1)$, $(x_2,y_2,z_2)$ and $(x_3,y_3,z_3)$ three predefined points, and a reference point $(x_R,y_R,z_R)$ located in the area between the three points.

First, a coordinate system may be defined based on the plane defined by the three predefined points, and an origin point defined as one of the points. At the start time, it may be defined:

$$v_{1_0} = (x_2-x_1, y_2-y_1, z_2-z_1)_0$$

$$v_{3_0} = (x_1-x_3, y_1-y_3, z_1-z_3)_0$$

$$v_{s_0} = v_{1_0} \times v_{3_0}$$

The origin point is the first point at time zero, $(x_1,y_1,z_1)_0$, and the plane vector is $v_{s_0}$, thus creating the $S_0$ coordinate system. The reference point vector in this coordinate system is $v_{R_0} = (x_R-x_1, y_R-y_1, z_R-z_1)_0$.

In a desired time t, the system may provide the positions of the predefined points. The new coordinate system may be calculated:

$$v_{1_t} = (x_2-x_1, y_2-y_1, z_2-z_1)_t$$

$$v_{3_t} = (x_1-x_3, y_1-y_3, z_1-z_3)_t$$

$$v_{s_t} = v_{1_t} \times v_{3_t}$$

The origin is now the point $(x_1,y_1,z_1)_t$ and the plane vector is $v_{s_t}$, thus creating the $S_t$ coordinate system.

The angle between $v_{s_0}$ and $v_{s_t}$ on each axis may be determined, providing the desired rotation angle of the coordinate systems. For example, for the z axis:

$$\alpha_{s_t} = \tan^{-1}\left(\frac{v_{s_{t_y}}}{v_{s_{t_x}}}\right)$$

$$\alpha_{s_0} = \tan^{-1}\left(\frac{v_{s_{0_y}}}{v_{s_{0_x}}}\right)$$

$$\theta_z = \alpha_{s_t} - \alpha_{s_0}$$

Using the rotation angles $\theta_x, \theta_y, \theta_z$, the rotation matrices may be defined for transforming vectors from the $S_0$ to the $S_t$ coordinate system:

$$R_x(\theta_x) = \begin{bmatrix} 1 & 0 & 0 \\ 0 & \cos\theta_x & -\sin\theta_x \\ 0 & \sin\theta_x & \cos\theta_x \end{bmatrix} = \exp\left(\begin{bmatrix} 0 & 0 & 0 \\ 0 & 0 & -\theta_x \\ 0 & \theta_x & 0 \end{bmatrix}\right)$$

$$R_y(\theta_y) = \begin{bmatrix} \cos\theta_y & 0 & \sin\theta_y \\ 0 & 1 & 0 \\ -\sin\theta_y & 0 & \cos\theta_y \end{bmatrix} = \exp\left(\begin{bmatrix} 0 & 0 & \theta_y \\ 0 & 0 & 0 \\ -\theta_y & 0 & 0 \end{bmatrix}\right)$$

$$R_z(\theta_z) = \begin{bmatrix} \cos\theta_z & -\sin\theta_z & 0 \\ \sin\theta_z & \cos\theta_z & 0 \\ 0 & 0 & 1 \end{bmatrix} = \exp\left(\begin{bmatrix} 0 & -\theta_z & 0 \\ \theta_z & 0 & 0 \\ 0 & 0 & 0 \end{bmatrix}\right)$$

The new reference point vector in the $S_t$ coordinate system would be calculated as: $v_{R_t} = R_z(\theta_z)R_y(\theta_y)R_x(\theta_x)$ $v_{R_0} = Rv_{R_0}$ Thus, the new reference point position would be $(x_R, y_R, z_R)_t = (x_1, y_1, z_1)_t + v_{R_t}$ The graphical object position, $(x_G, y_G, z_G)$ would follow the reference point using the same rotation matrix R. By defining its position in the $S_0$ coordinate system as: $v_{G_0} = (x_G - x_1, y_G - y_1, z_G - z_1)_0$, the transformation may be defined as $v_{G_t} = R_z(\theta_z)R_y(\theta_y)R_x(\theta_x)v_{R_0} = Rv_{G_0}$, and the new reference point position would be $(x_G, y_G, z_G)_t = (x_1, y_1, z_1)_t + v_{G_t}$ Such exemplary algorithm may enable determining relative locations between points and areas on NUI objects as defined by the user, or automatically created by the system. For example if a user places the glasses image on the NUI object eyes area the system will create a reference area that may be invisible for the user from the image shape, dimension and position. Tracking, pinning and physical areas which are defined by the application designer may create an additional layer on the timeline and an additional object in the design manager 526, this way physicality areas defined on a graphic object may be given different physicality attributes and may be linked together in the seams thus simulating a single object with multiple physicality types.

Design manager 526 may also be used for creating a scene that will be triggered by NUI, but in which the NUI object will be not be visible, as seen for example in the voice recognition example described in association with FIG. 4E above.

Tracking specifications in design manager 526 may be managed through NUI manager 524. Nui manager 524 may be responsible for managing NUI objects and their respective pre-defined points, converting NUI objects and their respective tracking, pinning and physicality points or areas into data structures readable to the NUI player through a NUI decoder and input controller 608 of FIG. 6, described below. Objects may be recorded through gesture manager 540 and saved as NUI objects by NUI manager 524.

Interactive design planner 520 may also comprise object properties manager 528 responsible for displaying and updating properties or characteristics of objects, such as NUI objects, graphic objects, or others, depending on the object type. Other characteristics such as special effects, physical properties and others may also be managed by object property manager 528. An object's properties may be changed using the properties window or pane.

Yet another component of interactive design planner 520 may be scene manager 530, responsible for managing the scenes, the scene objects and their properties as created using interactive manager 534, design manager 526 and timeline manager 536, and the relationship between them. Scene manager 530, responsible for handling, including adding or deleting scenes, associating scenes with each other, associating scenes with other objects and components in the system, or the like. Scenes may be ordered by time, e.g., one scene follows another, by command e.g., a gesture triggers a scene, by space, e.g., two or more scenes can occur simultaneously one on top of the other or at different areas of the display, or any combination thereof.

Interactive design planner 520 may also comprise display manager 532, responsible for the graphic display, including displaying objects, scenes, menus, windows and all other display items.

Interactive design planner 520 may further comprise interactive manager 534, responsible for managing interactive objects that represent the actions and the interactive actions between the different objects. The various interactive objects may implement various interactive options or capabilities, wherein connecting the objects may provide for graphic programming or visual programming which may be described as a flowchart, as disclosed in association with FIG. 4B above and exemplified in FIGS. 4C-4E above. The objects may be connected using predefined or prerecorded gestures or commands. The "graphic programming" may be implemented by using or creating a markup language from the user's selection, which may be encrypted into a data model readable by the player. Each interactive object may contain a set of encoded commands that may be translated by the player into programming functions, while connector objects may be translated into conditional statements such as if-then-else, switch, case, or others, using pointers, references, call commands or the like. Interactive manager 534 may also be responsible for dynamically updating selections, for example if a go-to-scene command is selected on an action interactive object, a dropdown list will be suggested which comprises scenes of the project. Options may also be conditional, for example if an interactive object is selected, the options may differ depending on the objects and layers connected to the given interaction. Such conditional options may be implemented by retrieving all options that are predefined for each interactive object type, and using different filtering and conditional functions to retrieve only data which is relevant for the user. The application designer may use pointing gestures which may act upon other layers. For example, if the user selects a gesture that supports pointing actions such as grab, swipe, release, push or others, a dropdown list of suitable events such as drag, drop, select, etc., may become available. Once the desired event is selected, the user may choose the object or layer it acts upon, the system may then retrieve the selected object's properties such as size, shape and position and convert them to pointer attributes such as starting point, drop zone, end point or the like, depending on the defined event. Suggestions of which interactive object may be connected to the preceding interactive object maybe done based on the interactive object type, preceding connectors, selections made by the user and such. For example, once the main interactive object, such as a NUI interactive object or an action interactive object is selected, a following connector may be suggested which may be further followed by output, such as effect, properties or an action interactive object, and so on. If the interaction created by the user lacks logic, the system may alert the user and suggest ways to resolve the issue, for example, if a gesture interactive object, a connector, or two interactive objects connected by a plus/and connector (which represent a nested "if" statement without output) are set as final interactive objects on a sequence, then the system may alert the user that the interaction is incomplete, and may suggest a connector or interactive object depending on the specific case. This may be done by implementing a set of rules which checks each conditional statement, and also the defined selections for each interactive object alone and as a sequence.

Yet another component of interactive design planner 520 may be timeline manager 536, responsible for displaying and controlling the presentation layers in the system along a timeline, and may also be used for providing a tree representation of the objects associated with each layer at each time period. Timeline manager may be used in design manager 526 for linking objects for tracking, and in interactive manger 534 for linking certain objects to a specific interaction.

Interactive design planner 520 may further comprise asset manager 538, responsible for managing and categorizing the graphic objects, such as images, videos, audio files or others which may be used in any of the project scenes. When any of the objects is placed on the working pane in design mode, a graphic object is created, associated with the layer on which it was placed, and appears in the timeline under the relevant layer.

Interactive design planner 520 may also comprise gesture manager 540, responsible for controlling and identifying the gestures available in the system for each NUI object. Gesture manager 540 is also responsible for adding and categorizing gestures and for recognizing those gestures to act accordingly to any command given through the interactive manager 534. It will be appreciated that gesture manager 540 may also be adapted for recording and categorizing new gestures which may also be used, for example, for learning user-defined gestures and recording sounds which may be later recognized by NUI manger 524. Recording gestures may be done using the same detection and tracking algorithms used in by the player's NUI decoder and input controller as described in association with FIG. 6 below.

Gesture manager 540, may also be responsible for recording objects or surroundings, by creating classification rules out of objects. For example a house may have classification rules such as windows, doors, roof or other classification rules. Each classification by itself may create a weak classifier. A weak classifier may be just slightly better than random input, but a strong classifier may be created by combining the decision of multiple weak classifiers into a definite decision. This can be performed, for example, by using variants of the AdaBoost learning algorithm or any other learning algorithm. These classifiers may be selected by the user, by creating frames around areas which may be used as classifiers, and converting them into recognizable objects for the player, using an object detection algorithm as described in association with FIG. 6 below.

NUI application development platform 516 may also comprise project manager 564, responsible for creating a project, loading, storing, or the like.

NUI application development platform 516 may further comprise file manager 562, responsible for associating activities such as load, store or the like, with the actual files in the file system and operations applied to these files.

NUI application development platform 516 may comprise save unit 554 and load unit 558, responsible, respectively, for saving and loading files such as project files, using the file system.

Yet another component of NUI platform development platform 516 may be settings manager 572, responsible for maintaining and updating user definitions, system definitions, or the like.

NUI application development platform 516 may also comprise passive media or video manager 544, which may be used for entering identification code or signal into passive media such as videos, images or the like, in order to tag and identify appropriate interactive media. Using passive media or video manager 544, a user may embed in a video such as a commercial identifier created by the platform for that media. Other methods for identifying the media may be used, such as fingerprinting in which the passive media or video manager 544 may be responsible for identifying, extracting and then compressing characteristic components of the media such as key frame analysis, color and motion changes during a video sequence, bit rate etc. This data may then be encoded to create a unique identifier for the media. When the identifier is detected, for example during broadcast, the player may check whether the relevant media is locally available. Once the identifier is embedded in the media, the media may be uploaded to a server such as a cloud server 580, so that the media can be distributed to customers.

Passive media or video manager 544 may comprise passive media importer 546, responsible for importing passive media such as video for embedding data such as an identification code therein, and passive media exporter 548 for exporting media such as video after the identification code has been embedded therein.

Passive media or video manager 544 may further comprise media encoder 550, which performs the actual encoding of the identifier into the video. The encoding can be performed using any digital steganography technology currently known or that will become known in the future, such as but not limited to fingerprinting, digital watermarking, or any ACR (Automatic Content Recognition) method. Digital watermarking may be done by using a modification method such as the Amplitude modification method also known as least significant bit (LSB) which adds hidden data into digital audio, video, or image signals, which may then be recognized. Alternatively, finger printing algorithms may extract and compress certain characteristic of the content into a unique fingerprint, thus leaving the original media unaltered. In such embodiments, media encoder 550 may not encode the media but analyze it to create such fingerprint. Digital watermarking techniques or products may be used, such as products of Digimarc of Beaverton, Oreg., USA or INTRASONICS, of Cambridge, United Kingdom. Fingerprinting products may be used such as those provided by Audible Magic Corporation of Los Gatos, Calif., USA or Zeitera Vvid, Calif. USA, or others.

The apparatus may further comprise or be in communication with one or more interactive media servers 576, which may store the media files created using the platform and which are to be played using the player. Servers 576 may comprise a system for managing distribution lists, and distribution terms and conditions for the available projects, and manage the distribution. The distribution may be managed using database server 584.

Interactive media servers 576 and DB server 584 may reside on computing platform 500 or on any other computing platform in communication with computing platform 500, via LAN, WAN, the Internet, or the like. Resources on interactive media servers 576 and DB server 584 may also be made available to computing platform 500 via cloud 580.

Figure 6:
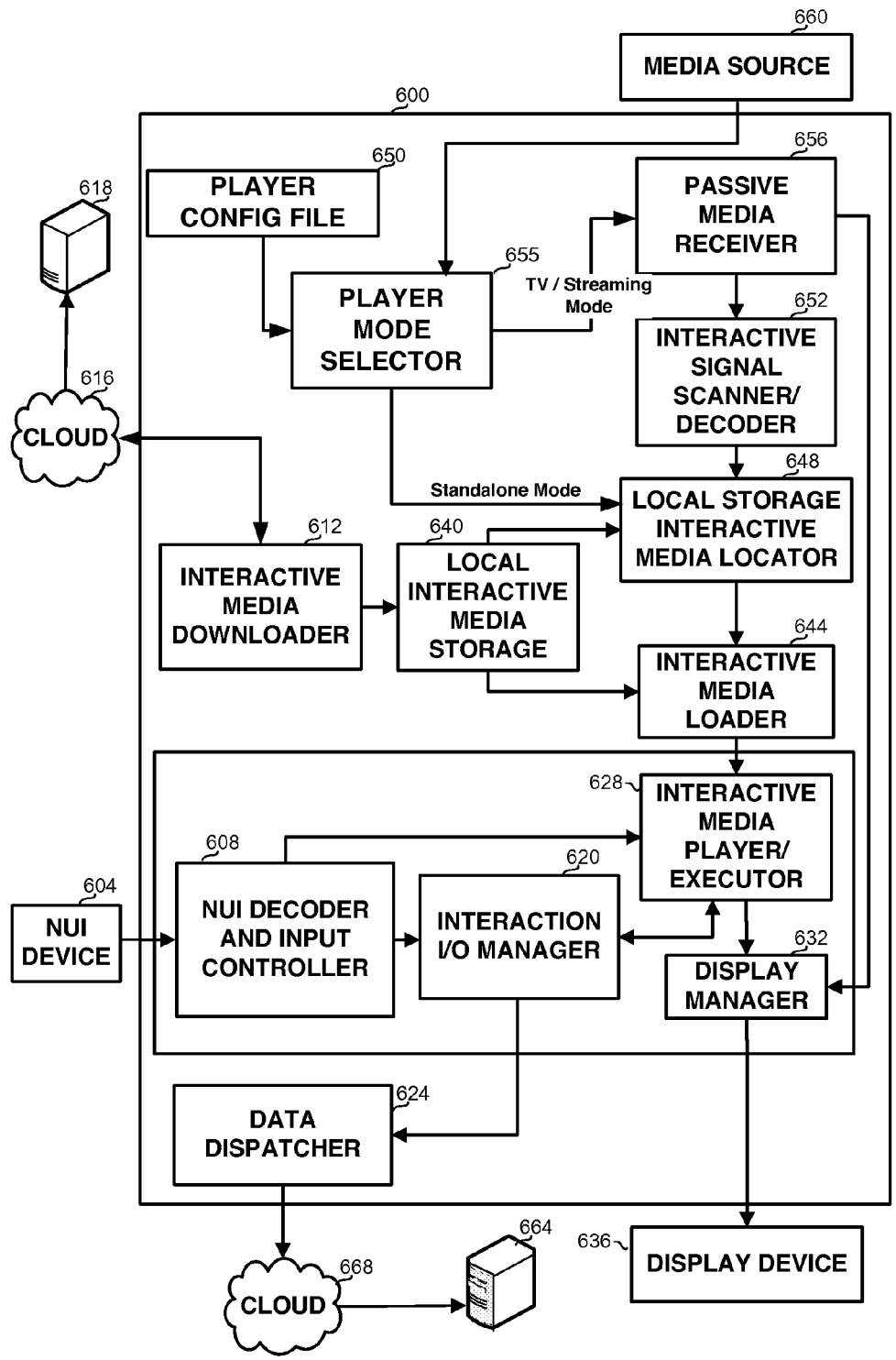
FIG. 6 is a block diagram showing the components of a player for playing NUI applications, in accordance with some exemplary embodiments of the disclosed subject matter.

FIG. 6 is a block diagram showing the components of a player for playing NUI applications. Some components of the block diagram in FIG. 6 are intended for a smart TV player, and may be omitted when another type of player, such as a standalone application is used. Player 600 may be executed by any computing platform, such as a personal computer, a laptop, a smartphone, a tablet, a smart TV or the like.

Player application 600 may be implemented as a set of one or more interconnected software components executed on a computing device. The computing device, similarly to computing device 500 of FIG. 5 may also comprise one or more processors or one or more I/O devices. The computing device may also comprise a storage device, to which the player application 600 is loaded.

Player application 600 may receive input from a NUI device 604, such as but not limited to a web camera, a depth camera, a Kinect™ device, a WII® remote control, a leap, a ringbow, an EEG helmet, a PS3® device, Arduino microcontroller, a touch sensor, or the like.

Input from NUI device 604 enters NUI decoder and input controller 608 adapted to interpret input data such as 2-D or 3-D locations, spoken word, RGB, depth data, skeleton data, sensor inputs or the like. Controller 608 may manage all communication with NUI device 604, using software drivers, SDKs, algorithms and libraries such that NUI device 604 is transparent to the user. Each NUI device supports a specific range of features, and NUI decoder and input controller 608 is responsible of wrapping such features into a common interface. If the NUI device driver or SDK does not support the feature for the selected NUI Object, then NUI decoder and input controller 608 may use any other relevant algorithm. The used algorithms may include but are not limited to: face, object and body detection, tracking and pose recognition algorithms such as Viola-Jones object detection framework for face tracking and object recognition; Conditional Density Propagation (condensation) for hand tracking; body tracking algorithms such as HumanEva Database and algorithm or 2-D Scaled Prismatic Model (SPM); voice and gesture recognition algorithms such as Hidden Markov Model or Baum-Welch algorithm; parameterized modeling of 2D articulated human shape; statistical inference for probabilistic functions of finite state Markov chains; maximization techniques in the statistical analysis of probabilistic functions of Markov chains; or the like.

If no suitable NUI device is detected, the player may look for a fallback option defined by the user of the platform. If more than one suitable NUI device is detected, the NUI decoder and input controller 608 may choose the most suitable NUI device, i.e., the NUI device that natively provides the highest amount of common features, the features most required by the application, or the like.

The data from NUI decoder input controller 608 may be provided to interaction I/O manager 620, which may identify activity such as gestures in the input from NUI decoder input controller 608 and may provide the activity and gestures to interactive media player or executor 628. Interaction I/O manager 620 is responsible for translating the encoded commands contained in the interactive objects as defined by the application designer in into executable instructions, while connector objects may be translated into conditional structures that may execute code segments based on conditional statements such as if-then-else, switch, case, pointers by reference, call commands and such.

Player application 600 may also receive interactive media from an external source such as cloud 616 associated with server 618, or any other location. The data may be received by interactive media downloader 612 adapted to receive the data and store it locally on local interactive media storage 640, which may be any storage device. The data may include a NUI application, for example a NUI application created using the platform. The NUI application may comprise instructions and/or data.

It will be appreciated that in the sunglasses example disclosed above, the user's face may be obtained through NUI device 604, while the application or the sunglasses catalog may be received from cloud 616.

The media or parts thereof may be loaded to memory from local interactive media storage 640 by interactive media loader 644.

The player may operate in at least two modes, which may be selected by player mode selector 655 in accordance with configurations indicated in player configuration file 650. When the mode is identified as "standalone" the player will receive the interactive media file name from player configuration file and 650 will check for the interactive media in local storage media locator 648.

In some embodiments, when the player is in TV/streaming mode, data such as broadcasted input passive media received from media source 660 by passive media receiver 656 may be used. The data may include cables TV, satellite broadcasting, streaming, real time data from a camera, or the like. Passive media may relate to a video or another signal which is not affected by the receiver, such that the same content is broadcast to a multiplicity of viewers.

The data may be processed by signal scanner or decoder 652, responsible for scanning the received stream for identifiers of a particular type, value, pattern, or the like. Such identifier may indicate that in a predetermined time, the NUI application may be executed and provide content to be embedded in the broadcasting. When an identifier is recognized, local storage interactive media locator 648 may locate the media associated with the identifier in media storage 640. If the media, such as the application has been located, the application may be executed including capturing the user by NUI device 604, and output from the application may be integrated into the passive media at a location associated with the location of the identified signal.

Interactive media player or executor 628 may thus receive NUI input from NUI decoder and input controller 608 and the gestures or actions identified therein, as well as one or more applications including instructions and/or data which may be loaded from an external source, and integrate the output of the application into the streamed content. For example, if streaming data is received, it may be combined with the application which integrates NUI object and gestures received from NUI decoder and input controller 608 and data from the application. Tracking objects defined in the platform as shown in FIGS. 3B-3C and described in association with design manager 526 of FIG. 5, may also be done by interactive media player or executor 628 in a similar manner to the tracking algorithm described in association with design manager 526 of FIG. 5 above. Interactive media player or executor 628 may comprise graphic engines such as a physicality engine, an effects engine, or others. An effect engine may be responsible for executing effects from the effect library. Effects may track NUI objects or react according to kinetic rules as defined on the platform by the application designer. A physicality engine may implement the physical properties and behaviors defined on objects or specific areas of objects on the platform, by providing an approximate simulation of the defined physical systems, such as the behaviors of rigid bodies, soft bodies, liquid, cloth and the like, and physical forces such as wind, gravity, friction, magnetism or others. These graphic engines or others may be developed using known physics calculations.

For example if rigid body physicality is applied to a 2D image representing a ball on the scene, the position of the moving object may be calculated in a 2D environment for each frame by using the following equations $$x_n = x_{n-1} + v_{x_{n-1}} t_n + \frac{1}{2} a_{x_n} t_n^2$$

$$y_n = y_{n-1} + v_{y_{n-1}} t_n + \frac{1}{2} a_{y_n} t_n^2$$

wherein n is the frame number, $t_n$ is the duration of the respective frame, $x_{n-1}$ and $y_{n-1}$ are the positions of the ball in the previous frame, n−1, on each axis, $v_{x_{n-1}}$ and $v_{y_{n-1}}$ are the velocities of the ball in the previous frame, n−1, on each axis, and $a_{x_n}$ and $a_{y_n}$ are the accelerations of the ball in the current frame, n, on each axis.

The velocities on each axis can be calculated using the following equations:

$$v_{x_{n-1}} = v_{x_{n-1}} + a_{x_{n-1}} t_n$$

$$v_{y_{n-1}} = v_{y_{n-2}} + a_{y_{n-1}} t_n$$

The velocity and acceleration of the ball may change on each frame depending on the environment and the ball's properties. For example, if a force is being used on the ball, depending on the ball's mass the acceleration would be determined using the next equation:

$$a = \frac{F}{m}$$

wherein F is the force being used on the ball, and
m is the ball's mass.

Thus, if a user would try to throw two virtual balls with the same force, each ball having different mass, the acceleration of the balls would differ, and they would move differently.

A gravity value may be defined for any direction, unlike real gravity that is usually directed downwards along the y axis. This allows the creation of wind and floating effects or scenes, by applying the acceleration on each axis which may comprise the defined 'gravity' and other momentary forces being applied at the object at the relevant time.

It will be appreciated that the above calculation is exemplary only, and that other calculations may be applied for achieving various effects.

Physicality areas, e.g., points or areas to which physical properties are assigned may be defined by the user as shown in FIG. 3B above, in which case a single object may be divided into two or more objects each having its own physical properties. The separate objects may be linked in "seams" or connecting areas, thus simulating a single object with multiple physicality types.

In some embodiments, one or more graphic objects may be integrated with the input from the NUI device such that the graphic object tracks a NUI object identified in the input, in accordance with identified gestures. For example, if an object was indicated to be attached to the user's hand when the application was developed, then if a hand raise gesture is identified, the object is to be raised as well.

The combined information may be transferred to display manager 632 adapted to render the application on a display device 636, which may be any display device such as an LCD display which may be standalone or associated with any device such as a laptop, a smart-phone or others, a smart TV, or any other device capable of displaying images or video. Display manager 632 may also receive the streamed data as received from the external source, and integrate it into the displayed stream.

The data from interaction I/O manager 620, such as the recognized gestures, may also be transferred to data dispatcher 624, which may send it to any external server 664 for example through cloud 668. Server 664 may be the same as server 618 or different, and similarly for cloud 616 and cloud 668. The data may be dispatched in order to pass information received from the user, such as votes in a reality show, or the like. Data dispatcher 624 may send data to cloud 668 or 616 data for creating a user profile which may take into account user parameters or characteristics such as age, geographic location, or the like which are taken from the computing device API (setup box, smart TV, phone, etc.)

It will be appreciated that the player application may be designed in a multiplicity of ways, to integrate data from a NUI device, a streaming source and preloaded data in a variety of ways, without deviating from the disclosed principles.

Figure 7:
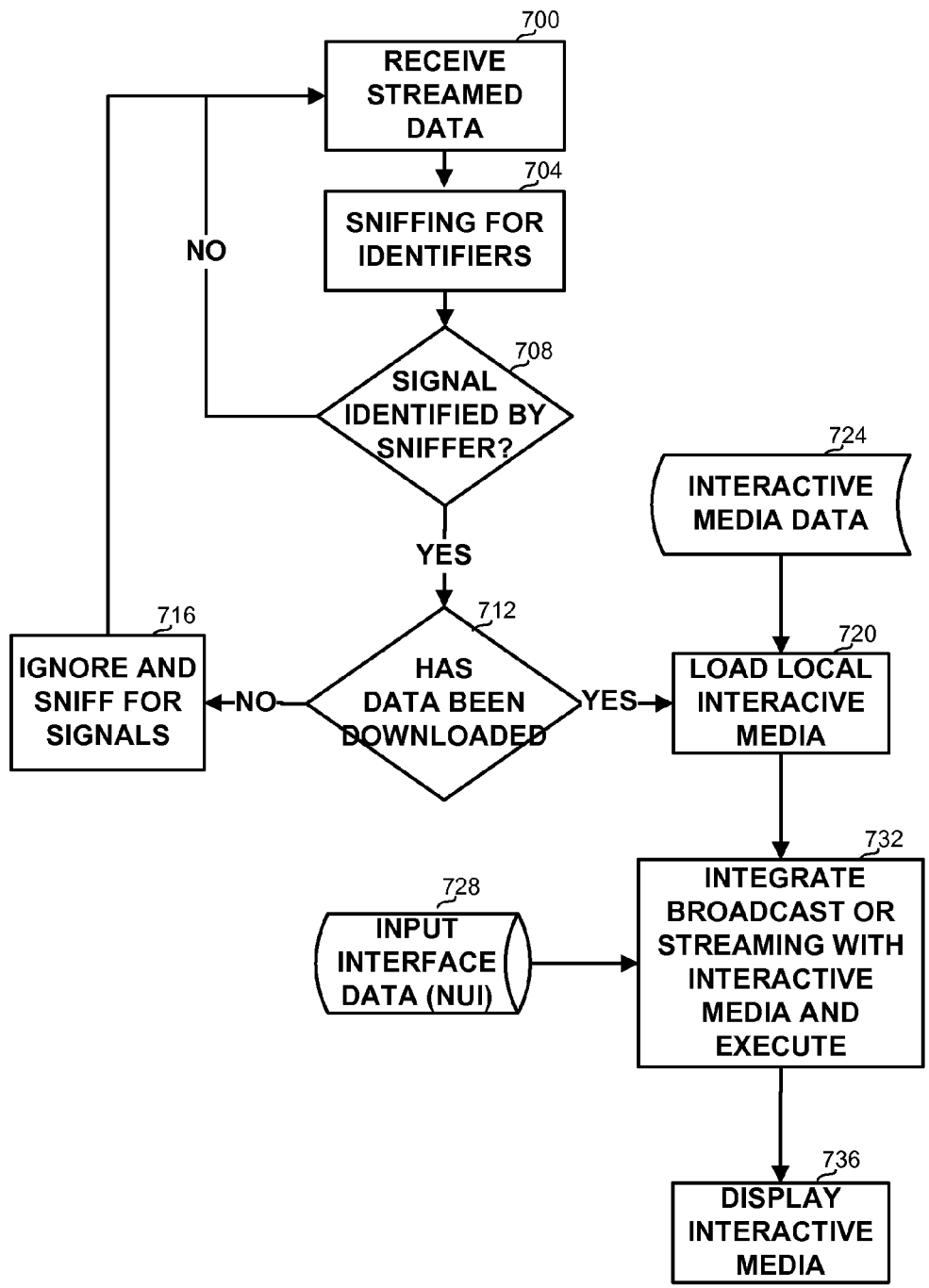
FIG. 7 is a flowchart showing steps in the operation of a player receiving streamed media, in accordance with some exemplary embodiments of the disclosed subject matter.

Referring now to FIG. 7, showing a flowchart of steps in the operation of a player for playing NUI applications.

On step 700, streamed data may be received from any source, such as cables TV, satellite broadcasting, streaming, real time data from a camera, or the like.

On step 704, which may be ongoing as the data is received, the data may be sniffed or searched for identifiers embedded therein or learned previously. The searched identifiers may be of particular type, pattern, value, structure, length, or the like. The identifier may also be embedded such that it is not felt by a viewer of the broadcasting, i.e. is not seen or heard by a human viewer.

On step 708 it may be determined whether an identifier signal was sniffed in the signal. If no, execution goes back to step 700, and more data is received and sniffed.

If an identifier is detected, then on step 712, it may be determined whether data associated with the identifier has previously been downloaded to the device or to a storage device accessible by the device. Such data may relate to a file having or associated with an identifier equal to or associated with the identifier embedded in the stream. The data may comprise instructions and/or content associated with a NUI application, for example a NUI application developed using the platform.

If data corresponding to the identifier has not been located, the identifier is ignored, execution goes back to step 700, and more data is received and sniffed.

If corresponding data has been loaded, then the corresponding interactive media data 724 may be loaded from a storage device on load local interactive media step 720.

On step 732, at a location associated with the sniffed signal, input data 728 captured from a NUI device may be used with the downloaded NUI application and integrated into the broadcast or stream.

On step 736 the integrated interactive media may be displayed on any associated display device.

It will be appreciated that the media files may be distributed to the end users based on distribution lists, criteria and schedules. For example, a distributing computing platform may attempt to distribute files to a subscriber. If the subscriber is offline or is otherwise not ready to receive the files, the distributor may attempt again at a later time. Alternatively, a subscriber may access a distributor on a daily, monthly or any other basis and check whether there files exist which it should receive.

The disclosed method and apparatus provide a computerized tool for creating NUI applications without programming, and a tool for playing or executing the applications. It will be appreciated that multiple variations may be designed for the disclosed methods and apparatus, and that the particular details are exemplary only and are not to limit the scope of the claims.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like, conventional procedural programming languages, such as the "C" programming language or similar programming languages, scripting languages such as Perl, Python, Ruby, or any other programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An apparatus having a processing unit and a storage device, the apparatus comprising:
   a natural user interface (NUI) development platform for developing a graphic NUI application, the graphic NUI application to be used by an end-user while the graphic NUI application is being executed without using the NUI development platform, the NUI development platform comprising:
      a design manager for indicating and linking during design time of the graphic NUI application, at least one graphic object and at least one NUI object, the at least one NUI object representing an object to be captured by a NUI device, such that during playing of the graphic NUI application, the at least one graphic object is intended to track the movements of the at least one NUI object, based on movements of the object; an interactive manager for managing during design time interactive actions between the at least one NUI object and the at least one graphic object, such that during playing of the graphic NUI application actions of the at least one NUI object cause actions of the at least one graphic object; and
      a NUI manager for defining a NUI device to be supported by a computing platform executing the NUI application,
      wherein the NUI application is developed graphically, and wherein the NUI application employs the NUI device when executed and displays the object as captured.

2. The apparatus of claim 1, wherein the at least one graphic object is designed to track the at least one NUI object on at least one tracking point or on at least tracking area comprising at least three tracking points defined on the at least one NUI object.

3. The apparatus of claim 1, wherein the design manager provides for indicating a reference point on the at least one NUI object for determining relative locations between at least one tracking point on the at least one NUI object and locations on the at least one graphic object.

4. The apparatus of claim 1, wherein the graphic object is associated with a pinning point associated with a physical property, such that the at least one graphic object or part thereof tracks the at least one NUI object in accordance with the physical property, when the NUI application is executed.

5. The apparatus of claim 1, wherein the at least one graphic object is selected from the group consisting of: a three dimensional representation of a physical object; a two dimensional representation of a physical object; an image; a video signal; an audio signal; a drawing; an illustration; and a recorded object.

6. The apparatus of claim 1, wherein the NUI device is selected from the group consisting of: a camera, a web camera, a depth camera, a computer gaming device, a virtual reality device, a leap, an EEG helmet, a smart phone, a tablet, and a computing platform equipped with a touch sensor.

7. The apparatus of claim 1, further comprising a gesture manager for defining gestures available in the system for the NUI device.

8. The apparatus of claim 1, further comprising a passive media manager for handling passive media, the passive media manager comprising a media encoder for associating an identifier with a video signal.

9. The apparatus of claim 1, wherein the interactive actions are provided by at least one interactive object.

10. The apparatus of claim 9, wherein the at least one interactive object is associated with programming commands when the NUI application is executed.

11. The apparatus of claim 1, wherein the interactive manager provides for at least one connector type, each of the at least one connector type associated with a conditional statement.

12. The apparatus of claim 1, wherein the at least one NUI object is associated with a predefined gesture and connected to at least one interactive object by a connector in a flowchart-like visual programming.

13. The apparatus of claim 1, wherein the NUI development platform provides a developer with visual representation of the human body or parts thereof, and tools to edit live video in a visual environment.

14. The apparatus of claim 1, wherein the NUI development platform provides for object recording during design time, such that the object is recognized once captured by the NUI device in playing time.

15. A computer-implemented method performed by a computerized device, comprising:
  receiving a NUI graphic application developed using a graphical user interface of a NUI development platform, the user interface comprising a scene containing at least one layer representing at least one object, comprising:
  receiving at least one graphic object, and at least one NUI object, the at least one NUI object representing an object to be captured by a NUI device, such that during playing of the graphic NUI application, the at least one graphic object and the NUI object are displayed, and the at least one graphic object is designed to track the movements of the at least one NUI object, based on movements of the object, and
  receiving interactive actions between the at least one NUI object and the at least one graphic object, such that during playing of the graphic NUI application actions of the at least one NUI object cause actions of the at least one graphic object;
  receiving an indication of a NUI device to be supported by a computing platform executing the NUI application; and
  storing the NUI application on a storage device, wherein the NUI application is developed graphically, and wherein the graphic NUI application to be used by an end-user while the graphic NUI application is being executed without using the NUI development platform, and wherein the NUI application employs the NUI device when executed.

16. The computer-implemented method of claim 15, wherein the NUI application is selected from the group consisting of: a user interacting with an object; and a user interacting with a projected surface.

* * * * *